(12) United States Patent
Zhou et al.

(10) Patent No.: US 12,500,270 B2
(45) Date of Patent: Dec. 16, 2025

(54) ELECTROLYTE AND ELECTROCHEMICAL APPARATUS INCLUDING SUCH ELECTROLYTE

(71) Applicant: Ningde Amperex Technology Limited, Fujian (CN)

(72) Inventors: Shaoyun Zhou, Fujian (CN); Chao Tang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 654 days.

(21) Appl. No.: 17/708,395

(22) Filed: Mar. 30, 2022

(65) Prior Publication Data

US 2022/0302501 A1 Sep. 22, 2022

Related U.S. Application Data

(63) Continuation of application No. PCT/CN2021/081338, filed on Mar. 17, 2021.

(51) Int. Cl.
| | | |
|---|---|---|
| *H01M 10/0568* | (2010.01) | |
| *H01M 4/02* | (2006.01) | |
| *H01M 4/505* | (2010.01) | |
| *H01M 4/525* | (2010.01) | |
| *H01M 10/0525* | (2010.01) | |
| *H01M 10/0569* | (2010.01) | |

(52) U.S. Cl.
CPC ....... *H01M 10/0568* (2013.01); *H01M 4/505* (2013.01); *H01M 4/525* (2013.01); *H01M 10/0525* (2013.01); *H01M 2004/021* (2013.01); *H01M 2004/028* (2013.01); *H01M 10/0569* (2013.01); *H01M 2300/0025* (2013.01)

(58) Field of Classification Search
CPC .... H01M 4/505; H01M 4/525; H01M 4/5825; H01M 10/0525; H01M 10/056; H01M 2004/028; H01M 2300/0025
See application file for complete search history.

(56) References Cited

U.S. PATENT DOCUMENTS

| | | |
|---|---|---|
| 2003/0124434 A1 | 7/2003 | Gan et al. |
| 2017/0256819 A1 | 9/2017 | Kondo et al. |

FOREIGN PATENT DOCUMENTS

| | | | |
|---|---|---|---|
| CN | 107611479 A | | 1/2018 |
| CN | 107658498 A | | 2/2018 |
| CN | 108123175 A | | 6/2018 |
| CN | 108539257 A | | 9/2018 |
| CN | 106848404 B | | 3/2019 |
| CN | 109411818 A | | 3/2019 |
| CN | 109546219 A | † | 3/2019 |
| CN | 110233291 A | † | 9/2019 |
| CN | 110556580 A | † | 12/2019 |
| CN | 110720156 A | | 1/2020 |
| CN | 110752408 A | | 2/2020 |
| CN | 110870126 A | | 3/2020 |
| CN | 110911752 A | | 3/2020 |
| CN | 111430800 A | † | 7/2020 |
| CN | 111653827 A | † | 9/2020 |
| CN | 111697268 A | † | 9/2020 |
| CN | 111864202 A | † | 10/2020 |
| CN | 112582674 A | | 3/2021 |
| CN | 112838272 A | | 5/2021 |
| CN | 112852674 A | | 5/2021 |
| EP | 3171445 A1 | | 5/2017 |
| EP | 3703174 A1 | | 9/2020 |
| JP | WO2020017318 A1 | | 1/2020 |
| WO | 2019200656 A1 | | 10/2019 |
| WO | 2020017318 A1 | | 1/2020 |
| WO | 2020241161 A1 | | 12/2020 |
| WO | 2021017759 A1 | | 2/2021 |

OTHER PUBLICATIONS

Office Action issued on Feb. 28, 2024, in corresponding Chinese Application No. 202180004604.1, 22 pages.
Office Action issued on Aug. 16, 2024, in corresponding Chinese Application No. 202180004604.1, 18 pages.
Extended Search Report issued on Nov. 25, 2022, in corresponding European Application No. 21867911.6, 12 pages.
International Search Report issued on Dec. 13, 2021 in corresponding International Patent Application No. PCT/CN2021/081338; 4 pages.

† cited by third party

*Primary Examiner* — Aiqun Li
(74) *Attorney, Agent, or Firm* — Maier & Maier, PLLC

(57) ABSTRACT

An electrolyte including lithium bis(fluorosulfonyl)imide and lithium hexafluorophosphate, where based on a total weight of the electrolyte, a weight percentage of lithium bis(fluorosulfonyl)imide is a %, and a weight percentage of lithium hexafluorophosphate is b %, where $12<a+b<20$ and $0.2<a/b<1.5$. An electrochemical apparatus using the electrolyte described in this application can achieve high energy density while also ensuring rate performance at room temperature and high temperature and cycling stability at room temperature and high temperature.

16 Claims, No Drawings

ELECTROLYTE AND ELECTROCHEMICAL APPARATUS INCLUDING SUCH ELECTROLYTE

CROSS REFERENCE TO RELATED APPLICATIONS

This application is a bypass continuation application of PCT international application: PCT/CN2021/081338, filed on Mar. 17, 2021, the disclosure of which is hereby incorporated by reference in its entirety.

TECHNICAL FIELD

This application relates to the field of energy storage technologies, and in particular, to an electrolyte and an electrochemical apparatus including such electrolyte.

BACKGROUND

With the popularization and application of smart products, demands for mobile phones, notebook computers, cameras, and other electronic products have increased year by year, and electrochemical apparatuses, as the power source of electronic products, are playing an increasingly important role in daily live. Lithium-ion batteries are widely used in the field of consumer electronics by virtue of their advantages such as high specific energy, high working voltage, low self-discharge rate, small size, light weight, long life, and no memory effect.

However, with the widespread application of electrochemical apparatuses in the above-mentioned field, people have increasingly higher requirements for energy density of the electrochemical apparatuses, which forces the electrochemical apparatuses to continuously increase energy density in design and development. For example, with regard to the positive electrode material of electrochemical apparatuses, increasing the percentage of Ni in a lithium transition metal oxide positive electrode material to form a high-nickel material can well increase a gram capacity of the positive electrode material. However, after the positive electrode material is highly nickelized, kinetic performance of the material decreases, and residual alkali on a surface of the material increases, which is likely to produce gas (especially in a high-temperature environment). For another example, increasing the compacted density of active material layers in a positive electrode plate and a negative electrode plate can well increase volumetric energy density of the electrochemical apparatus. However, this results in smaller porosity of the electrode plates and lower liquid retention of the electrolyte, thereby leading to poor kinetic performance of the electrochemical apparatus. Therefore, how to achieve high energy density while also ensuring kinetic/rate (especially kinetic/rate at low temperature) performance and other performances (for example, cycling performance) of the electrochemical apparatus is a problem that needs to be considered and resolved.

SUMMARY

Embodiments of this application relate to an electrolyte and an electrochemical apparatus containing such electrolyte. The electrolyte includes lithium bis(fluorosulfonyl)imide (LiFSI) and lithium hexafluorophosphate ($LiPF_6$), where based on a total weight of the electrolyte, a weight percentage of lithium bis(fluorosulfonyl)imide is a %, and a weight percentage of lithium hexafluorophosphate is b %, where $12<a+b<20$ and $0.2<a/b<1.5$. The foregoing formulation can not only ensure that the electrolyte contains enough lithium ions and low viscosity to make the electrolyte have better kinetics, but also can prevent corrosion of LiFSI to an aluminum foil, so that the electrochemical apparatus has excellent rate performance, low-temperature performance, cycling performance, and high-temperature performance.

According to an embodiment of this application, the weight percentage a % of lithium bis(fluorosulfonyl)imide or the weight percentage b % of lithium hexafluorophosphate satisfies at least one of the following condition (1) or condition (2):

$$2<a<11; \text{ or} \qquad (1)$$

$$4.8<b<14. \qquad (2)$$

According to this embodiment of this application, the electrolyte further includes a first compound, where the first compound includes at least one of ethyl methyl carbonate (EMC) or diethyl carbonate (DEC); and based on the total weight of the electrolyte, a weight percentage of the first compound is c %, where $c<10$. Compared with dimethyl carbonate (DMC), ethyl methyl carbonate (EMC) and diethyl carbonate (DEC) have relatively high boiling points and relatively better thermal stability, but relatively high viscosity and relatively worse kinetics. Controlling the percentage of the first compound to be lower than 10% is beneficial to optimize kinetic performance of the electrochemical apparatus while also ensuring high-temperature performance of the electrochemical apparatus.

According to this embodiment of this application, the electrolyte further includes dimethyl carbonate (DMC), where based on the total weight of the electrolyte, a weight percentage of dimethyl carbonate (DMC) is d %, where $45<d<70$. Dimethyl carbonate (DMC) has low viscosity and high stability. Under the condition that DMC is to interact with lithium bis(fluorosulfonyl)imide and lithium hexafluorophosphate, controlling its percentage to be higher than 45% is beneficial to improve the kinetic performance of the electrochemical apparatus. However, dimethyl carbonate (DMC) has relatively low boiling point. Further controlling its percentage to be lower than 70% is beneficial to improve the kinetic performance of the electrochemical apparatus while also ensuring high-temperature performance of the electrochemical apparatus.

In some embodiments, based on the total weight of the electrolyte, the weight percentage d % of dimethyl carbonate (DMC) further satisfies $50<d<65$, which can further equilibrate the kinetic performance and the high-temperature performance of the electrochemical apparatus.

According to this embodiment of this application, the electrolyte further includes a second compound, where the second compound includes at least one of ethylene sulfate (DTD), 2,4-butane sultone, 5-methyloxathiolane 2,2-dioxide, or 1,3-propane sultone (PS); and based on the total weight of the electrolyte, a weight percentage of the second compound is e %, where $e≤3$. The second compound interacts with lithium bis(fluorosulfonyl)imide and lithium hexafluorophosphate, which can significantly improve the high-temperature performance of the electrochemical apparatus, thereby ensuring that the electrochemical apparatus has excellent rate performance and low-temperature performance, and better ensuring the high-temperature performance. However, addition of excessive ethylene sulfate (DTD) increases acidity of the electrolyte and reduces stability of the electrolyte itself; and addition of excessive 2,4-butane sultone, 5-methyloxathiolane 2,2-dioxide, or 1,3-propane sultone (PS) increases impedance of the electrochemical apparatus and deteriorates the low-temperature performance of the electrochemical apparatus. It is found in this application that when the percentage e % of the second compound satisfies e≤3, it is beneficial to equilibrate the low-temperature performance and high-temperature performance of the electrochemical apparatus.

In some embodiments, based on the total weight of the electrolyte, the weight percentage of the 1,3-propane sultone (PS) ranges from 0.1% to 2.0%, which can further equilibrate the high-temperature performance and the low-temperature performance of the electrochemical apparatus.

According to this embodiment of this application, the electrolyte further includes a third compound, where the third compound includes at least one of vinylene carbonate (VC), vinyl ethylene carbonate (VEC), and fluoroethylene carbonate (FEC); and based on the total weight of the electrolyte, a weight percentage of the third compound is f %, where f<4. The third compound interacts with lithium bis(fluorosulfonyl)imide and lithium hexafluorophosphate, which can further improve the cycling performance of the electrochemical apparatus. However, addition of excessive third compound increases the impedance of the electrochemical apparatus and affects the rate performance and the low-temperature performance of the electrochemical apparatus. Therefore, the percentage of the third compound is controlled to be lower than 4%.

In some embodiments, based on the total weight of the electrolyte, a weight percentage of vinylene carbonate (VC) ranges from 0.1% to 2%, which can reduce the impedance of the electrochemical apparatus while also ensuring cycling performance of the electrochemical apparatus in room-temperature and high-temperature environments, thereby improving the rate performance of the electrochemical apparatus in the room-temperature and high-temperature environments.

According to this embodiment of this application, the electrolyte further includes a propynyl compound, where the propynyl compound includes at least one of 2-propyn-1-yl 1H-imidazole-1-carboxylate or 2-propynyl methyl carbonate; and based on the total weight of the electrolyte, a weight percentage of the propynyl compound is g %, where g<1. The propynyl compound interacts with lithium bis(fluorosulfonyl)imide and lithium hexafluorophosphate, which can further improve the high-temperature performance and the cycling performance of the electrochemical apparatus. However, addition of excessive propynyl compound also affects the impedance of the electrochemical apparatus. Therefore, it is preferable to control the weight percentage of the propynyl compound to be lower than 1%.

According to this embodiment of this application, the electrolyte further includes a boron-containing lithium salt, where the boron-containing lithium salt includes at least one of lithium difluoro(oxalato)borate (LiDFOB), lithium bis(oxalato)borate (LiBOB), lithium tetrafluoroborate (LiBF$_4$), or lithium tetraborate (Li$_2$B$_4$O$_7$); and based on the total weight of the electrolyte, a weight percentage of the boron-containing lithium salt is h %, where h<1. The boron-containing lithium salt interacts with lithium bis(fluorosulfonyl)imide and lithium hexafluorophosphate, which can further improve the cycling performance of the electrochemical apparatus. However, addition of excessive boron-containing lithium salt affects other performances of the electrochemical apparatus, for example, high-temperature storage performance and the impedance of the electrochemical apparatus. Therefore, it is preferable to control the weight percentage of the boron-containing lithium salt to be lower than 1%.

According to this embodiment of this application, the electrolyte further includes a difluorophosphate salt, where the difluorophosphate salt includes at least one of lithium difluorophosphate (LiPO$_2$F$_2$) or lithium difluorooxalate phosphate (LiDFOP); and based on the total weight of the electrolyte, a weight percentage of the difluorophosphate salt is i %, where i<1.5. The difluorophosphate salt interacts with lithium bis(fluorosulfonyl)imide and lithium hexafluorophosphate, which can further improve the low-temperature performance, the storage performance, and the cycling performance of the electrochemical apparatus. However, solubility of lithium difluorophosphate (LiPO$_2$F$_2$) in a carbonate solvent is relatively low. Lithium difluorophosphate (LiPO$_2$F$_2$) is easy to precipitate due to addition of excessive lithium difluorophosphate (LiPO$_2$F$_2$), thereby affecting the performances of the electrochemical apparatus, and addition of excessive lithium difluorooxalate (LiDFOP) affects the high-temperature performance of the electrochemical apparatus. Therefore, the weight percentage of the difluorophosphate salt is controlled to be lower than 1.5%.

In another embodiment, this application provides an electrochemical apparatus, where the electrochemical apparatus includes the electrolyte as described in any of the foregoing embodiments. According to this embodiment of this application, the electrochemical apparatus further includes a positive electrode, a negative electrode, and a separator provided between the positive electrode and the negative electrode.

According to this embodiment of this application, the positive electrode includes a positive electrode current collector and a positive electrode active material layer provided on at least one surface of the positive electrode current collector, where the positive electrode active material layer includes a positive electrode active material, and the positive electrode active material satisfies at least one of the following condition (3) or condition (4):

(3) the positive electrode active material includes a nickel-containing material, and the nickel-containing material includes Li$_x$Ni$_y$Me$_z$O$_2$, where Me includes at least one element of Co, Mn, Al, W, Mg, Ti, Zr, Y, Sr, Cu, F, Si, Na, Fe, Ca, S, or B, 0.5≤x<1.2, 0.5≤y≤0.96, and 0<z≤0.5; and based on a total weight of the positive electrode active material, a weight percentage of the nickel-containing material is higher than or equal to 70%; or (4) the positive electrode active material includes lithium iron phosphate, where based on a total weight of the positive electrode active material, a weight percentage of the lithium iron phosphate is higher than or equal to 70%, and compacted density of the positive electrode active material layer is j g/cm$^3$, where 0.35<a/j<7.5.

According to this embodiment of this application, when the condition (3) is satisfied, 4<b/y<40.

When the positive electrode active material includes the nickel-containing material described in the foregoing condition (3), as a percentage of nickel increases, gram capacity of the positive electrode active material increases, and energy density of the electrochemical apparatus also increases accordingly. When the percentage of the nickel-containing material is higher than or equal to 70%, the electrochemical apparatus can have higher energy density. However, as the percentage of nickel increases, there may be more residual lithium on the surface of nickel-containing materials, which is likely to produce gas (especially in a high-temperature environment). Because under the action of water, a small amount of $LiPF_6$ decomposed and formed hydrofluoric acid, and hydrofluoric acid can neutralize part of the residual lithium and form a LiF protection layer in a chemical conversion stage of the electrochemical apparatus. Therefore, under the condition that $4<b/y<40$, controlling the percentages of $LiPF_6$ and Ni can further improve the room-temperature cycling performance and the high-temperature cycling performance of the electrochemical apparatus, while also ensuring other performances of the electrochemical apparatus.

When the positive electrode active material includes the lithium iron phosphate described in the foregoing condition (4), because the lithium iron phosphate material has good safety, the safety performance of the electrochemical apparatus can be further improved when the weight percentage of the lithium iron phosphate is higher than or equal to 70%. As the compacted density of the positive electrode active material layer increases, diffusion kinetics of lithium ions in the positive electrode active material layer is affected. This requires the electrolyte to have higher kinetics to compensate for insufficiency caused by the high compacted density of the positive electrode active material layer. Increasing the percentage of LiFSI in the electrolyte is beneficial to improvement of kinetics of the electrolyte. Therefore, when the condition $0.35<a/j<7.5$ is satisfied, controlling the percentage of LiFSI and the compacted density of the positive electrode active material layer can further improve the rate performance and low-temperature performance of the electrochemical apparatus, while also ensuring cycling performance of the electrochemical apparatus.

According to this embodiment of this application, the negative electrode includes a negative electrode current collector and a negative electrode active material layer provided on at least one surface of the negative electrode current collector, where the negative electrode active material layer includes a negative electrode active material.

In another embodiment, this application provides an electronic apparatus, where the electronic apparatus includes the electrochemical apparatus described in any one of the foregoing embodiments.

Additional aspects and advantages of the embodiments of this application are partially described and presented in subsequent descriptions, or explained by implementation of the embodiments of this application.

DETAILED DESCRIPTION

The term "about" used herein are intended to describe and represent small variations. When used in combination with an event or a circumstance, the term may refer to an example in which the exact event or circumstance occurs or an example in which an extremely similar event or circumstance occurs. For example, when used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, quantities, ratios, and other values are sometimes presented in the format of ranges in this specification. It should be understood that such range formats are used for convenience and simplicity and should be flexibly understood as including not only values clearly designated as falling within the range but also all individual values or sub-ranges covered by the range as if each value and sub-range are clearly designated.

As used herein, the content of each component is obtained based on the total weight of the electrolyte solution.

I. Electrolyte Solution

Researches on electrolytes in this field is hard to achieve high energy density while also ensuring kinetics/rate (especially low-temperature kinetics/low-temperature rate) performance and other performances (for example, cycling performance) of electrochemical apparatuses. For example, some researchers add a sulfate compound (for example, ethylene sulfate) as an additive in an electrolyte, which can reduce impedance of a solid electrolyte interface film (SEI film) of an electrochemical apparatus and improve kinetic performance of the electrochemical apparatus. However, this cannot resolve the kinetic problem caused by concentration polarization and diffusion due to low liquid retention capacity and high compacted density of the electrochemical apparatus. For example, some other researchers have increased a percentage of lithium salt $LiPF_6$ in the electrolyte, which can better overcome a defect of insufficient absolute content of lithium ions caused by the low liquid retention capacity. However, an excessively high percentage of $LiPF_6$ increases viscosity of the electrolyte, which negatively affects the kinetic performance (especially low-temperature kinetic performance) of the electrochemical apparatus. In addition, $LiPF_6$ is easily decomposed at high temperature, and an excessively high concentration of $LiPF_6$ is not conducive to stability of the electrolyte itself.

At least based on the foregoing insights and after heavy researches, this application optimizes the types, total amount, and proportion of lithium salts in the electrolyte to meet the high energy density requirement while also ensuring the rate performance, low-temperature performance, cycling performance, and high-temperature performance of the electrochemical apparatus, thereby obtaining an electrochemical apparatus with good comprehensive performance.

In an embodiment of this application, both lithium bis(fluorosulfonyl)imide (LiFSI) and lithium hexafluorophosphat ($LiPF_6$) are added to an electrolyte to provide lithium ions required by an electrochemical apparatus in a charging and discharging process. In one aspect, this application controls a sum of concentrations of the foregoing two lithium salts to be higher than 12% to ensure that the electrolyte contains enough lithium ions to support various performances of the electrochemical apparatus. However, this application further finds that as the concentrations of the lithium salts gradually increase, viscosity of the electrolyte increases accordingly, which increases difficulty of lithium ion migration in the electrolyte, resulting in a decrease in the kinetic performance of the electrochemical apparatus. Based on this, this application further proposes that the sum of the concentrations of the foregoing two lithium salts is controlled to be lower than 20%. In another aspect, this application uses the more easily dissociated lithium salt LiFSI to improve the conductivity of the electrolyte, thereby improving the rate performance and the low-temperature performance of the electrochemical apparatus while taking the cycling performance and the high-temperature performance of the electrochemical apparatus into account. However, it is further found in this application that LiFSI corrodes an aluminum foil current collector in the electrochemical apparatus to some extent, and therefore it is difficult to solely use LiFSI as a primary salt; while $LiPF_6$ can react on a surface of the aluminum foil current collector to form a layer of dense $AlF_3$ passivated aluminum foil, thereby reducing the corrosion of LiFSI to the aluminum foil. Based on this, it is further found through researches in this application that controlling a ratio of LiFSI to $LiPF_6$ within a specified range can not only prevent the corrosion of LiFSI to the aluminum foil, but also can enable the electrolyte to have better kinetics, thereby obtaining an electrochemical apparatus with excellent comprehensive performance (for example, taking rate performance, low-temperature performance, cycling performance, and high-temperature performance into account).

Based on the foregoing descriptions, an embodiment of this application provides an electrolyte. The electrolyte includes lithium bis(fluorosulfonyl)imide (LiFSI) and lithium hexafluorophosphate ($LiPF_6$). Based on a total weight of the electrolyte, a weight percentage of lithium bis(fluorosulfonyl)imide is a %, and a weight percentage of lithium hexafluorophosphate is b %, where 12<a+b<20 and 0.2<a/b<1.5. For example, a+b may be, but is not limited to, within a range of any two of 12.2, 13, 14, 15, 16, 17, 18, 19, or 19.8. For example, a/b may be, but is not limited to, within a range of any two of 0.21, 0.4, 0.5, 0.7, 0.9, 1.1, 1.3, or 1.4.

In some embodiments, the weight percentage a % of lithium bis(fluorosulfonyl)imide or the weight percentage b % of lithium hexafluorophosphate satisfies at least one of the following condition (1) or condition (2):

$$2<a<11; \text{ or} \quad (1)$$

$$4.8<b<14. \quad (2)$$

When the weight percentage a % of lithium bis(fluorosulfonyl)imide satisfies the foregoing condition (1), it can further avoid corrosion to an aluminum foil due to an excessively high percentage of LiFSI, or avoid limited help to kinetics due to an excessively low percentage of LiFSI, thereby improving comprehensive performance of an electrochemical apparatus.

When the weight percentage b % of lithium hexafluorophosphate satisfies the foregoing condition (2), it can further avoid excessively high viscosity of the electrolyte due to an excessively high percentage of $LiPF_6$, or avoid insufficient passivation of the aluminum foil due to an excessively low percentage of $LiPF_6$, thereby improving comprehensive performance of the electrochemical apparatus.

In some embodiments, a may be, but is not limited to, within a range of any two of 2.2, 3, 4, 5, 6, 7, 8, 9, 10, or 10.7. In some embodiments, b may be, but is not limited to, within a range of any two of 4.9, 5, 6, 7, 8, 9, 10, 11, 12, or 13.8.

According to the electrolyte described in the foregoing embodiment, in this application, other components are further added to the electrolyte and percentages thereof are studied to further improve the comprehensive performance of the electrochemical apparatus. The following describes in detail other components in the electrolyte that are concerned in this application.

(I) First Compound

In some embodiments of this application, the electrolyte further includes a first compound, where the first compound includes at least one of ethyl methyl carbonate (EMC) or diethyl carbonate (DEC).

It is found through researches in this application that, in linear carbonate, compared with dimethyl carbonate (DMC), ethyl methyl carbonate (EMC) and diethyl carbonate (DEC) have relatively high boiling points and relatively better thermal stability, but relatively high viscosity and relatively worse kinetics. Therefore, it is required to control the percentage of the first compound in the electrolyte to optimize kinetic performance of the electrochemical apparatus. In some embodiments, based on a total weight of the electrolyte, a weight percentage of the first compound is c %, where c<20. In some embodiments, c satisfies c≤15, c≤10, or c≤5.

(II) Dimethyl Carbonate (DMC)

In some embodiments, the electrolyte solution further includes dimethyl carbonate (DMC). It is found through researches in this application that, in linear carbonate, dimethyl carbonate (DMC) has low viscosity and high stability. Dimethyl carbonate interacts with lithium bis(fluorosulfonyl)imide and lithium hexafluorophosphate, which is beneficial to improve the kinetic performance of the electrochemical apparatus, and therefore dimethyl carbonate is suitable as a primary component of an organic solvent in the electrolyte.

In some embodiments, based on the total weight of the electrolyte, a weight percentage of dimethyl carbonate (DMC) is d %, where 40<d<80. However, dimethyl carbonate (DMC) has relatively low boiling point. Further controlling its percentage to be lower than 70% is beneficial to improve the high-temperature performance of the electrochemical apparatus. Therefore, in some embodiments, d satisfies 45<d<70. In addition, researches of this application indicate that when d satisfies 50<d<65, both the kinetic performance and the high-temperature performance of the electrochemical apparatus can be better achieved.

(III) Second Compound

In some embodiments of this application, the electrolyte further includes a second compound, where the second compound includes at least one of ethylene sulfate (DTD), 2,4-butane sultone, 5-methyloxathiolane 2,2-dioxide, or 1,3-propane sultone (PS).

The second compound interacts with lithium bis(fluorosulfonyl)imide and lithium hexafluorophosphate, which can significantly improve the high-temperature performance of the electrochemical apparatus, thereby ensuring that the electrochemical apparatus has excellent rate performance (particularly excellent low-temperature performance), and better ensuring the high-temperature performance. However, addition of excessive second compound can also affect the electrochemical apparatus. For example, it is indicated through researches in this application that addition of excessive ethylene sulfate (DTD) increases acidity of the electrolyte and reduces stability of the electrolyte itself; and addition of excessive 2,4-butane sultone, 5-methyloxathiolane 2,2-dioxide, or 1,3-propane sultone (PS) increases impedance of the electrochemical apparatus and affects the low-temperature performance of the electrochemical apparatus.

In some embodiments of this application, based on the total weight of the electrolyte, a weight percentage of the second compound is e %, where e≤4. It is further found in this application that when e satisfies e≤3, the high-temperature performance and the low-temperature performance of the electrochemical apparatus can be better equilibrated. In some embodiments, e satisfies e≤2, e≤1.5, e≤1.0, or e≤0.5.

In addition, in some embodiments, based on the total weight of the electrolyte, the weight percentage of 1,3-propane sultone (PS) does not exceed 2%. It is further found in this application that when the weight percentage of the 1,3-propane sultone (PS) ranges from 0.1% to 2.0%, the high-temperature performance and the low-temperature performance of the electrochemical apparatus can be further optimized.

(IV) Third Compound

In some embodiments of this application, the electrolyte further includes a third compound, where the third compound includes at least one of vinylene carbonate (VC), vinyl ethylene carbonate (VEC), and fluoroethylene carbonate (FEC).

The third compound interacts with lithium bis(fluorosulfonyl)imide and lithium hexafluorophosphate, which can further improve the cycling performance of the electrochemical apparatus. However, addition of excessive third compound increases the impedance of the electrochemical apparatus and affects the rate performance and the low-temperature performance of the electrochemical apparatus. In some embodiments, based on the total weight of the electrolyte, a weight percentage of the third compound is f %, where f<4. In some embodiments, f satisfies f≤3, f≤2.5, f≤2, f≤1.5, f≤1, or f≤0.5.

In addition, in some embodiments, based on the total weight of the electrolyte, a weight percentage of vinylene carbonate (VC) is lower than or equal to 3%. It is further found in this application that when the weight percentage of vinylene carbonate (VC) ranges from 0.1% to 2%, the impedance of the electrochemical apparatus can be reduced on the basis of ensured cycling performance of electrochemical apparatus in room-temperature and high-temperature environments, thereby improving the rate performance of the electrochemical apparatus in the room-temperature and high-temperature environments.

In some embodiments of this application, 0.3≤e+f≤6. In some embodiments, 0.3≤e+f≤5. When e+f falls within this range, the cycling performance of the electrochemical apparatus in room-temperature and high-temperature environments, the low-temperature performance and the rate performance at room temperature can be taken into account.

(V) Propynyl Compound

In some embodiments of this application, the electrolyte further includes a propynyl compound, where the propynyl compound includes at least one of 2-propyn-1-yl 1H-imidazole-1-carboxylate or 2-propynyl methyl carbonate.

The propynyl compound interacts with lithium bis(fluorosulfonyl)imide and lithium hexafluorophosphate, which can further improve the high-temperature performance and the cycling performance of the electrochemical apparatus. However, addition of excessive propynyl compound also increases the impedance of the electrochemical apparatus. In some embodiments, based on the total weight of the electrolyte, a weight percentage of the propynyl compound is g %, where g<1. In some embodiments, g satisfies g≤0.8, g≤0.6, g≤0.4, or g≤0.2.

(VI) Boron-Containing Lithium Salt

In some embodiments of this application, the electrolyte further includes a boron-containing lithium salt, where the boron-containing lithium salt includes at least one of lithium difluoro(oxalato)borate (LiDFOB), lithium bis(oxalato)borate (LiBOB), lithium tetrafluoroborate ($LiBF_4$), or lithium tetraborate ($Li_2B_4O_7$).

The boron-containing lithium salt interacts with lithium bis(fluorosulfonyl)imide and lithium hexafluorophosphate, which can further improve the cycling performance of the electrochemical apparatus. However, addition of excessive boron-containing lithium salt deteriorates other performances of the electrochemical apparatus, for example, the high-temperature storage performance and the impedance of the electrochemical apparatus. In some embodiments, based on the total weight of the electrolyte, a weight percentage of the boron-containing lithium salt is h %, where h<1. In some embodiments, h satisfies h≤0.8, h≤0.6, h≤0.4, or h≤0.2.

(VII) Difluorophosphate Salt

In some embodiments of this application, the electrolyte further includes a difluorophosphate salt, where the difluorophosphate salt includes at least one of lithium difluorophosphate ($LiPO_2F_2$) or lithium difluorooxalate phosphate (LiDFOP).

The difluorophosphate salt interacts with lithium bis(fluorosulfonyl)imide and lithium hexafluorophosphate, which can further improve the low-temperature performance, the storage performance, and the cycling performance of the electrochemical apparatus. However, solubility of lithium difluorophosphate ($LiPO_2F_2$) in a carbonate solvent is relatively low. Therefore, $LiPO_2F_2$ is easy to precipitate due to addition of excessive $LiPO_2F_2$, thereby affecting the performance of the electrochemical apparatus, and addition of excessive lithium difluorooxalate (LiDFOP) affects the high-temperature performance (for example, the high-temperature storage performance) of the electrochemical apparatus. In some embodiments, based on the total weight of the electrolyte, a weight percentage of the difluorophosphate salt is i %, where i<1.5. In some embodiments, i satisfies i≤1.2, i≤0.9, i≤0.7, or i≤0.5.

(VIII) Other Additives

In some embodiments, the electrolyte according to this application includes, but is not limited to: a phosphorus-containing organic compound, an aromatic fluorine-containing compound, or any combination thereof.

In some embodiments, the phosphorus-containing organic compound in this application includes, but is not limited to, trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris (2,2,2-trifluoroethyl) phosphate, and tris(2,2,3,3,3-pentafluoropropyl) phosphate.

In some embodiments, the aromatic fluorine-containing compound in this application includes, but is not limited to, fluorobenzen, difluorobenzene, trifluorobenzene, tetrafluorobenzene, pentafluorobenzene, hexafluorobenzene, and benzotrifluoride.

In some embodiments, the other additives in this application may be used alone, or two or more of them may be used together.

II. Electrochemical Apparatus

The electrochemical apparatus according to this application includes any apparatus in which electrochemical reactions take place. Specific examples of the apparatus include all kinds of primary batteries and secondary batteries. Specially, the electrochemical apparatus is a lithium secondary battery, including a lithium metal secondary battery, a lithium-ion secondary battery, a lithium polymer secondary battery, or a lithium-ion polymer secondary battery. In some embodiments, the electrochemical apparatus according to this application is an electrochemical apparatus provided with a positive electrode having a positive electrode active material capable of occluding and releasing metal ions, and a negative electrode having a negative electrode active material capable of occluding and releasing metal ions. The electrochemical apparatus includes any one of the foregoing electrolytes in this application.

Electrolyte

The electrolyte used in the electrochemical apparatus according to this application is any one of the foregoing electrolytes in this application. In addition, the electrolyte used in the electrochemical apparatus according to this application may also include other electrolytes within the scope without departing from the essence of this application.

Negative Electrode

A material, a structure, and a preparation method known in the art may be used to prepare a material for a negative electrode used in the electrochemical apparatus according to the embodiments of this application. For example, the negative electrode in this application may be prepared by the technology described in the US patent application U.S. Pat. No. 9,812,739B, which is incorporated in this application by reference in its entirety.

In some embodiments, a negative electrode active substance is any substance capable of electrochemically occluding and releasing metal ions such as lithium ions. In some embodiments, a negative electrode active substance includes a carbonaceous material, a silicon-carbon material, an alloy material, or a lithium-containing metal composite oxide material. In some embodiments, the negative electrode active substance includes one or more of the foregoing substances.

In some embodiments, the negative electrode may be formed by adding a binder into the negative electrode active substance, adding a thickener, a conductive material, a filling material, or the like as needed to make a slurry, coating the slurry on the current collector, and performing compression after drying.

Positive Electrode

In the electrochemical apparatus according to this application, the positive electrode includes a positive electrode current collector and a positive electrode active material layer provided on at least one surface of the positive electrode current collector, and the positive electrode active material layer includes a positive electrode active material.

In some embodiments, the positive electrode is made by applying, on the current collector, a positive electrode active substance layer including lithium transition metal-based compound powder and a binder.

In some embodiments, the positive electrode active substance layer can usually be made by the following operations: dry mixing the positive electrode material and the binder (further adding a conductive agent, a thickener, or the like as required) to form a sheet, pressing the obtained sheet to the positive electrode current collector, or dissolving or dispersing these materials in a liquid medium to form a slurry, which is applied on the positive electrode current collector as a coating and dried. In some embodiments, the material of the positive electrode active substance layer includes any material known in the art. In some embodiments, the positive electrode active substance layer includes the materials described in U.S. Pat. No. 9,812,739B.

It is found through researches in this application that the positive electrode active material includes a nickel-containing material, and the nickel-containing material includes $Li_xNi_yMe_zO_2$, where Me includes at least one element of Co, Mn, Al, W, Mg, Ti, Zr, Y, Sr, Cu, F, Si, Na, Fe, Ca, S, or B, $0.5 \leq x < 1.2$, $0.5 \leq y \leq 0.96$, $0 < z \leq 0.5$. By controlling the percentage of $LiPF_6$ in the electrolyte and the percentage of Ni in the positive electrode active material to satisfy $4 < b/y < 40$, the room-temperature cycling performance and high-temperature cycling performance of the electrochemical apparatus can be further improved while other performances of the electrochemical apparatus are also ensured. This is because when the percentage of nickel contained in the positive electrode active material is relatively high, more residual lithium appears on the surface of the positive electrode active material, which is more likely to produce gas (especially in a high-temperature environment); and adjusting the percentage of $LiPF_6$ in the electrolyte based on the percentage of Ni in the positive electrode active material can promote decomposition of $LiPF_6$ in the electrolyte to a small amount of hydrofluoric acid under the action of water, thereby neutralizing part of the residual lithium and forming a LiF protection layer (for example, in a chemical conversion stage of the electrochemical apparatus) to improve the cycle stability of the electrochemical apparatus. Based on a total weight of the positive electrode active material, when a weight percentage of the nickel-containing material $Li_xNi_yMe_zO_2$ is higher than or equal to 70%, the cycle stability of the electrochemical apparatus can be further improved.

Compacted Density of Active Material Layer

The electrochemical apparatus according to this application includes a positive electrode, a negative electrode, a separator, and an electrolyte. The positive electrode and the negative electrode each include a current collector and an active material layer provided on the current collector. The active material layer includes a single-sided coating layer, a double-sided coating layer, or a combination thereof. The single-sided coating layer is a coating layer formed by applying a slurry on one surface of the current collector; and the double-sided coating layer is a coating layer formed by applying a slurry on two opposite surfaces of the current collector.

In a wound electrochemical apparatus, a positive electrode and a negative electrode each are usually formed by winding a strip-shaped electrode plate. Therefore, there may be both a single-sided coating layer and a double-sided coating layer on the strip-shaped electrode plate. In a laminated electrochemical apparatus, a positive electrode, a separator, and a negative electrode are stacked, and there is only a single-sided coating layer or a double-sided coating layer on one electrode plate (a positive electrode plate or a negative electrode plate). In an electrochemical apparatus with a mixed assembly of winding and lamination, a positive electrode plate and a negative electrode plate usually include a strip-shaped electrode plate including both a single-sided coating layer and a double-sided coating layer, and a sheet-shaped electrode plate including only a single-sided coating layer or a double-sided coating layer.

The positive electrode active material layer and the negative electrode active material layer each have compacted density of electrode plate. The compacted density of the active material layer is obtained by the following method: measuring a thickness of the electrode plate first by using an accurate measuring tool, such as a ten-thousandth micrometer; then taking a specified area of an electrode plate, and accurately measuring the area and the weight of the electrode plate; and calculating the compacted density of the electrode plate by using the following formula:

Active material compacted density=(electrode plate weight−current collector weight)/electrode plate area/(electrode plate thickness−current collector thickness).

Lower compacted density makes higher porosity, so that some particles are in an insulating state and unable to participate in the charge and discharge, resulting in a low discharge specific capacity, which affects the performances of the electrochemical apparatus. Excessively high compacted density may increase difficulty in infiltration of the electrolyte, and decrease the liquid retention capacity, and the cycling and rate performance cannot be guaranteed. Proper control of the compacted density of the electrode plates with the single-sided coating layer and the double-sided coating layer is very important for obtaining an electrochemical apparatus with high capacity density and excellent cycle and storage performance.

It is found through researches in this application that when the positive electrode active material includes lithium iron phosphate, controlling the percentage a % of LiFSI in the electrolyte, and the compacted density of the positive electrode active material layer j g/cm$^3$, to satisfy 0.35<a/j<7.5 can further improve the rate performance and the low-temperature performance of the electrochemical apparatus, while also ensuring good cycling performance of the electrochemical apparatus. This is because LiFSI has better kinetic performance. Increasing the percentage of LiFSI in the electrolyte can compensate for the poor diffusion kinetics caused by the high compacted density of the electrode plates. Based on the total weight of the positive electrode active material, when a weight percentage of lithium iron phosphate is higher than or equal to 70%, the safety performance and kinetic performance of the electrochemical apparatus can be further improved.

Separator

In some embodiments, the electrochemical apparatus according to this application has a separator provided between the positive electrode and the negative electrode to prevent short circuits. The separator used in the electrochemical apparatus according to this application is not particularly limited to any material or shape, and may be based on any technology disclosed in the prior art. In some embodiments, the separator includes a polymer or an inorganic substance formed by a material stable to the electrolyte of this application.

For example, the separator may include a substrate layer and a surface treatment layer. The substrate layer is a non-woven fabric, a membrane or a composite membrane having a porous structure, and a material of the substrate layer is at least one selected from polyethylene, polypropylene, polyethylene terephthalate, or polyimide. Specifically, a polypropylene porous membrane, a polyethylene porous membrane, a polypropylene non-woven fabric, a polyethylene non-woven fabric or a polypropylene-polyethylene-polypropylene porous composite membrane can be selected.

The surface treatment layer is provided on at least one surface of the substrate layer, and the surface treatment layer may be a polymer layer or an inorganic layer, or may be a layer formed by a mixed polymer and an inorganic substance.

The inorganic layer includes inorganic particles and a binder. The inorganic particles are selected from a combination of one or more of aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is selected from a combination of one or more of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene, and polyhexafluoropropylene. The polymer layer contains a polymer, and a material of the polymer includes at least one of polyamide, polyacrylonitrile, acrylate polymer, polyacrylic acid, polyacrylate, polyvinylpyrrolidone, polyvinyl ether, polyvinylidene fluoride, or poly(vinylidene fluoride-hexafluoropropylene).

III. Application

The electrolyte according to the embodiments of this application can achieve high energy density while also ensuring kinetic/rate (especially low-temperature kinetics/low-temperature rate) performance and other performances (for example, cycling performance and high-temperature performance) of the electrochemical apparatus, and is suitable for use in an electronic device including the electrochemical apparatus.

The electrochemical apparatus according to this application is not particularly limited to any purpose, and may be used for any known purposes. For example, the electrochemical apparatus may be used for a notebook computer, a pen-input computer, a mobile computer, an electronic book player, a portable telephone, a portable fax machine, a portable copier, a portable printer, a headset, a video recorder, a liquid crystal television, a portable cleaner, a portable CD player, a mini-disc, a transceiver, an electronic notebook, a calculator, a storage card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, a lithium ion capacitor, or the like.

EXAMPLES

Below, this application will be further specifically described with examples and comparative examples, and this application is not limited to these examples as long as the essence of this application is not departed from.

1. Preparation of a Lithium-Ion Battery (1) Preparation of a Positive Electrode Plate A positive electrode active material ($LiNi_{0.85}Co_{0.05}Mn_{0.1}O_2$, $LiNi_{0.85}Co_{0.1}Al_{0.05}O_2$, $LiNi_{0.7}Co_{0.15}Mn_{0.15}O_2$, $LiNi_{0.5}Co_{0.2}Mn_{0.3}O_2$, a mixture of $LiNi_{0.85}Co_{0.05}Mn_{0.1}O_2$ and $LiMn_2O_4$ at a weight ratio of 8:2, $LiFePO_4$, $LiFePO_4$, and a mixture of $LiFePO_4$ and $LiMn_2O_4$ at a weight ratio of 9:1 are each used as an example in this application), conductive carbon black, polyvinylidene fluoride serving as a binder were mixed at a weight ratio of 96:2:2. N-methylpyrrolidone (NMP) was added. Then the resulting mixture was stirred evenly by a vacuum mixer to obtain a positive electrode slurry. The positive electrode slurry was applied uniformly on both sides of an aluminum foil positive electrode current collector. The aluminum foil was dried in an oven at 85° C., followed by cold pressing under different pressures, cutting, and slitting. A resulting material was dried at 85° C. for 4 hours under vacuum, to obtain a positive electrode plate with different positive electrode active material layers and different compacted densities.

(2) Preparation of a Negative Electrode Plate

Artificial graphite serving as a negative electrode active material, conductive carbon black, sodium carboxymethyl cellulose (CMC) serving as a thickener, and styrene butadiene rubber (SBR) serving as a binder were mixed at a weight ratio of 96:1:1:2. Deionized water was added. Then, the resulting mixture was stirred by a vacuum mixer to obtain a negative electrode slurry. The negative electrode slurry was applied uniformly on two sides of a copper foil negative electrode current collector. The copper foil was dried in an oven at 85° C., followed by cold pressing, cutting, and slitting. A resulting material was dried under vacuum at 120° C. for 12 hours to obtain a negative electrode plate.

(3) Preparation of an Electrolyte

In a dry argon or nitrogen environment, the electrolytes in Examples and Comparative Examples were prepared according to the substances and contents shown in the following table, and percentages of the substances in electrolyte described below were calculated based on the total weight of the electrolyte.

(4) Preparation of a Separator

A polyethylene (PE) porous polymer film was used as the separator.

(5) Preparation of a Lithium-Ion Battery

The positive electrode plate, the separator, and the negative electrode plate were stacked in sequence, so that the separator was sandwiched between the positive electrode plate and the negative electrode plate for separation. Then they were wound to obtain a bare cell. After tabs were welded, the bare cell was placed into a cylindrical stainless steel shell to obtain a dry cell. The electrolytes prepared in Examples and Comparative Examples were injected into the dried dry cell. Then a lithium-ion battery was obtained after operations such as packaging, standing, chemical conversion, and capacity testing.

2. Battery Performance Test Methods (1). Test for Discharge Capacity and Rate Performance of the Lithium-Ion Battery The lithium-ion battery was placed in a 25° C. thermostat and stood for 30 minutes, so that the lithium-ion battery reached a constant temperature. The lithium-ion battery that had reached a constant temperature was charged to a specified charge voltage at a constant current of 1 C (constant-current charged to 4.2 V for a positive electrode active material containing $LiNi_{0.85}Co_{0.05}Mn_{0.1}O_2$, $LiNi_{0.85}Co_{0.1}Al_{0.05}O_2$, $LiNi_{0.7}Co_{0.15}Mn_{0.15}O_2$, $LiNi_{0.5}Co_{0.2}Mn_{0.3}O_2$, a mixture of $LiNi_{0.85}Co_{0.05}Mn_{0.1}O_2$ and $LiMn_2O_4$ at a weight ratio of 8:2; and constant-current charged to 3.65 V for a positive electrode active material containing $LiFePO_4$ and a mixture of $LiFePO_4$ and $LiMn_2O_4$ at a weight ratio of 9:1), and then constant-voltage charged to a current of 0.05 C at the charge voltage. Subsequently, the lithium-ion battery was separately discharged to a specified discharge voltage at a constant current of 1 C and a constant current of 5 C (constant-current discharged to 2.8 V for a positive electrode active material containing $LiNi_{0.85}Co_{0.05}Mn_{0.1}O_2$, $LiNi_{0.85}Co_{0.1}Al_{0.05}O_2$, $LiNi_{0.7}Co_{0.15}Mn_{0.15}O_2$, $LiNi_{0.5}Co_{0.2}Mn_{0.3}O_2$, a mixture of $LiNi_{0.85}Co_{0.05}Mn_{0.1}O_2$ and $LiMn_2O_4$ at a weight ratio of 8:2; and constant-current discharged to 2.5 V for a positive electrode active material containing $LiFePO_4$ and a mixture of $LiFePO_4$ and $LiMn_2O_4$ at a weight ratio of 9:1), to obtain a 1 C discharge capacity and a 5 C discharge capacity of the lithium-ion battery. The 5 C discharge capacity was divided by the 1 C discharge capacity to obtain a 5 C capacity retention ratio.

The lithium-ion battery was placed in a 25° C. thermostat and stood for 30 minutes, so that the lithium-ion battery reached a constant temperature. The lithium-ion battery that had reached a constant temperature was charged to a specified charge voltage (which is the same as the foregoing charge voltage) at a constant current of 1 C, and then constant-voltage charged to a current of 0.05 C at the charge voltage. Subsequently, the lithium-ion battery was discharged to a specified discharge voltage (which is the same as the foregoing discharge voltage) at a constant current of 10 C to obtain a 10 C discharge capacity of the lithium-ion battery. The 10 C discharge capacity was divided by the 1 C discharge capacity to obtain a 10 C capacity retention ratio.

(2) Low-Temperature Discharge Test of the Lithium-Ion Battery

The lithium-ion battery was placed in a 25° C. thermostat and stood for 30 minutes, so that the lithium-ion battery reached a constant temperature. The lithium-ion battery that had reached a constant temperature was charged to a specified charge voltage (which is the same as the foregoing charge voltage) at 1 C, and then constant-voltage charged to a current of 0.05 C at the charge voltage. Subsequently, the battery was placed in a −20° C. thermostat and stood for 4 hours, discharged to a specified discharge voltage (which is the same as the foregoing discharge voltage) at a constant current of 0.5 C to obtain a 0.5 C low-temperature discharge capacity of the lithium-ion battery. The 0.5 C low-temperature discharge capacity was divided by the 1 C discharge capacity obtained based on the test (1) to obtain a 0.5 C low-temperature capacity retention ratio.

The lithium-ion battery was placed in a 25° C. thermostat and stood for 30 minutes, so that the lithium-ion battery reached a constant temperature. The lithium-ion battery that had reached a constant temperature was charged to a specified charge voltage (which is the same as the foregoing charge voltage) at 1 C, and then constant-voltage charged to a current of 0.05 C at the charge voltage. Subsequently, the battery was placed in a −20° C. thermostat and stood for 4 hours, discharged to a specified discharge voltage (which is the same as the foregoing discharge voltage) at a constant current of 1 C to obtain a 1 C low-temperature discharge capacity of the lithium-ion battery. The 1 C low-temperature discharge capacity was divided by the 1 C discharge capacity obtained based on the test (1) to obtain a 1 C low-temperature capacity retention ratio.

(3) Room-Temperature Cycling Performance Test of the Lithium-Ion Battery

The lithium-ion battery was placed in a 25° C. thermostat, so that the lithium-ion battery reached a constant temperature. The lithium-ion battery was charged to a specified charge voltage (which is the same as the foregoing charge voltage) at a constant current of 1 C, and then constant-voltage charged to a current of 0.05 C at the charge voltage. Subsequently, the lithium-ion battery was discharged to a specified discharge voltage (which is the same as the foregoing discharge voltage) at a constant current of 5 C, which was denoted as one cycle of test. The foregoing charge and discharge process was repeated, a discharge capacity corresponding to each cycle was recorded, and the number of cycles at room temperature was recorded when the discharge capacity was attenuated to 80% of the initial discharge capacity.

(4) High-Temperature Cycling Performance Test of the Lithium-Ion Battery

The lithium-ion battery was placed in a 45° C. thermostat, so that the lithium-ion battery reached a constant temperature. The lithium-ion battery was charged to a specified charge voltage (which is the same as the foregoing charge voltage) at a constant current of 1 C, and then constant-voltage charged to a current of 0.05 C at the charge voltage. Subsequently, the lithium-ion battery was discharged to a specified discharge voltage (which is the same as the foregoing discharge voltage) at a constant current of 5 C, which was denoted as one cycle of test. The foregoing charge and discharge process was repeated, a discharge capacity corresponding to each cycle was recorded, and the number of cycles at high temperature was recorded when the discharge capacity was attenuated to 80% of the initial discharge capacity.

3. Test Results (1) The electrolytes were prepared according to the formulation shown in Table 1-1. Ethylene carbonate (EC) and dimethyl carbonate (DMC) were used as organic solvents, lithium bis(fluorosulfonyl)imide (LiFSI) and lithium hexafluorophosphate ($LiPF_6$) were used as electrolyte salts, and the third compound (that is, at least one of vinylene carbonate (VC), vinyl ethylene carbonate (VEC), and fluoroethylene carbonate (FEC)) serving as an additive was added. The prepared lithium-ion battery was tested according to the foregoing test methods. The positive electrode active material was $LiNi_{0.85}Co_{0.05}Mn_{0.1}O_2$. For test results, refer to Table 1-2.

TABLE 1-1

| | Weight percentage of component in electrolyte (%) | | | | | | |
|---|---|---|---|---|---|---|---|
| | EC | DMC | VC | VEC | FEC | $LiPF_6$ | LiFSI |
| Electrolyte 1# | 20 | 66 | 1.5 | | | 10 | 2.5 |
| Electrolyte 2# | 18 | 61 | 1.5 | | | 15 | 4.5 |
| Electrolyte 3# | 20 | 64 | 1.5 | | | 6 | 8.5 |
| Electrolyte 4# | 19.2 | 61 | 1.5 | 0.3 | 1 | 7 | 10 |
| Electrolyte 5# | 20 | 60 | 3 | | | 7 | 10 |
| Electrolyte 6# | 10.5 | 72 | 1.5 | | | 12 | 4 |
| Electrolyte 7# | 20.1 | 60.4 | 2.5 | | | 7 | 10 |
| Electrolyte 8# | 20.3 | 60.7 | 2 | | | 7 | 10 |
| Electrolyte 9# | 20.4 | 61.1 | 1.5 | | | 7 | 10 |
| Electrolyte 10# | 20.5 | 61.5 | 1 | | | 7 | 10 |
| Electrolyte 11# | 20.6 | 61.9 | 0.5 | | | 7 | 10 |
| Electrolyte 12# | 20 | 61 | | | | 9 | 10 |
| Comparative Electrolyte 1# | 20 | 66 | 1.5 | | | 12.5 | |
| Comparative Electrolyte 2# | 20 | 66 | 1.5 | | | | 12.5 |
| Comparative Electrolyte 3# | 18 | 61 | | | | 19.5 | |
| Comparative Electrolyte 4# | 18 | 61 | 1.5 | | | | 19.5 |
| Comparative Electrolyte 5# | 20 | 61 | | | | 16 | 3 |
| Comparative Electrolyte 6# | 18 | 61 | | | | 17 | 4 |

As shown in Table 1-1 and Table 1-2, compared with Examples 1 and 2, because neither of Comparative Electrolyte 1# and Comparative Electrolyte 3# contained the lithium salt LiFSI, the rate performance at room temperature and low temperature and the cycling performance at room temperature and high temperature of the accordingly obtained lithium-ion batteries were not ideal. Compared with Example 12, Comparative Electrolyte 5# has a/b<0.2, and Comparative Electrolyte 6# has a+b>20, and the performance of the accordingly obtained lithium-ion batteries were not ideal.

Compared with Examples 1 and 2, because neither of Comparative Electrolyte 2# and Comparative Electrolyte 4# contained the lithium salt $LiPF_6$, the lithium-ion batteries have good rate performance at room temperature and low temperature. However, the cycling performance at room temperature and high temperature has been significantly deteriorated, which was due to the lack of the passivation effect of $LiPF_6$ on the aluminum foil.

In addition, it can be seen from the data in Examples 1 to 12 in Table 1-1 and Table 1-2 that when the weight percentages of lithium salts LiFSI and $LiPF_6$ in the electrolyte (a % and b %, respectively) satisfied 12<a+b<20 and 0.2<a/b<1.5, the obtained electrochemical apparatuses exhibited excellent comprehensive performance.

Further compared with the comprehensive performance of the batteries in Example 5 and Examples 7 to 11, when the weight percentage of VC ranged from 0.1% to 2%, although the cycling performance of the resulting electrochemical apparatuses in room-temperature and high-temperature environments were slightly decreased, the rate performance in the room-temperature and low-temperature environments have been greatly improved, which was of great significance for the application of electrochemical apparatuses in the fields such as unmanned aerial vehicles and electric vehicles.

(2) The electrolytes were prepared according to the formulation shown in Table 2-1 (where DMC was used as the primary organic solvent), and the prepared lithium-ion batteries were tested according to the foregoing test methods, and the positive electrode active material in Table 2-2 was $LiNi_{0.85}Co_{0.05}Mn_{0.1}O_2$. For test results, refer to Table 2-2.

TABLE 1-2

| Number | Electrolyte | Capacity retention rate at 5 C (%) | Capacity retention rate at 10 C (%) | Low-temperature capacity retention rate at 0.5 C (%) | Low-temperature capacity retention rate at 1 C (%) | Number of cycles at room temperature | Number of cycles at high temperature |
|---|---|---|---|---|---|---|---|
| Example 1 | Electrolyte 1# | 85 | 78 | 80 | 75 | 1280 | 758 |
| Example 2 | Electrolyte 2# | 87 | 83 | 81 | 75 | 1321 | 1012 |
| Example 3 | Electrolyte 3# | 92 | 88 | 89 | 83 | 1125 | 738 |
| Example 4 | Electrolyte 4# | 93 | 87 | 83 | 78 | 1389 | 990 |
| Example 5 | Electrolyte 5# | 82 | 73 | 78 | 65 | 1395 | 998 |
| Example 6 | Electrolyte 6# | 81 | 71 | 86 | 77 | 1178 | 910 |
| Example 7 | Electrolyte 7# | 85 | 75 | 80 | 68 | 1300 | 976 |
| Example 8 | Electrolyte 8# | 89 | 83 | 84 | 76 | 1251 | 910 |
| Example 9 | Electrolyte 9# | 93 | 88 | 86 | 80 | 1210 | 858 |
| Example 10 | Electrolyte 10# | 94 | 89 | 88 | 83 | 1208 | 841 |
| Example 11 | Electrolyte 11# | 94 | 89 | 89 | 84 | 1189 | 835 |
| Example 12 | Electrolyte 12# | 92 | 87 | 87 | 82 | 1100 | 801 |
| Comparative Example 1 | Comparative Electrolyte 1# | 75 | 60 | 60 | 48 | 880 | 612 |
| Comparative Example 2 | Comparative Electrolyte 2# | 93 | 89 | 93 | 88 | 662 | 315 |
| Comparative Example 3 | Comparative Electrolyte 3# | 70 | 62 | 52 | 33 | 770 | 610 |
| Comparative Example 4 | Comparative Electrolyte 4# | 89 | 86 | 86 | 75 | 549 | 302 |
| Comparative Example 5 | Comparative Electrolyte 5# | 77 | 64 | 65 | 53 | 610 | 448 |
| Comparative Example 6 | Comparative Electrolyte 6# | 78 | 65 | 61 | 47 | 632 | 461 |

TABLE 2-1

| | Weight percentage of component in electrolyte (%) | | | | | | | | | |
|---|---|---|---|---|---|---|---|---|---|---|
| | EC | EMC | DEC | DMC | VC | VEC | FEC | PS | LiPF$_6$ | LiFSI |
| Electrolyte 13# | 20 | 5 | | 55.2 | 1.8 | | | | 9 | 9 |
| Electrolyte 14# | 20 | | 7 | 51.2 | | 0.5 | 1.5 | | 8 | 11.8 |
| Electrolyte 15# | 22 | 15 | | 44.5 | 1.5 | | | | 8 | 9 |
| Electrolyte 16# | 20 | 5 | | 55 | 4 | | | | 11 | 5 |
| Electrolyte 17# | 19.7 | 4.0 | | 55.3 | 1.5 | | | | 8 | 11.5 |
| Electrolyte 18# | 20.1 | 4.0 | | 56.4 | 1.5 | | | | 8 | 10 |
| Electrolyte 19# | 20.7 | 4.1 | | 57.7 | 1.5 | | | | 8 | 8 |
| Electrolyte 20# | 21.2 | 4.2 | | 59.1 | 1.5 | | | | 8 | 6 |
| Electrolyte 21# | 24.2 | 4.9 | | 55.3 | 1.5 | | | | 15.5 | 4 |
| Electrolyte 22# | 20.1 | 4.0 | | 56.4 | 1.5 | | | | 14.5 | 4 |
| Electrolyte 23# | 20.4 | 4.1 | | 57 | 1.5 | | | | 13 | 4 |
| Electrolyte 24# | 21.2 | 4.2 | | 59.1 | 1.5 | | | | 10 | 4 |
| Electrolyte 25# | 12.1 | 2.4 | | 68 | 1.5 | | | | 8 | 8 |
| Electrolyte 26# | 28.7 | 5.8 | | 48 | 1.5 | | | | 8 | 8 |
| Electrolyte 27# | 17.1 | 3.4 | | 62 | 1.5 | | | | 8 | 8 |
| Electrolyte 28# | 32.1 | 6.4 | | 44 | 1.5 | | | | 8 | 8 |
| Electrolyte 29# | 8.7 | 1.8 | | 72 | 1.5 | | | | 8 | 8 |
| Electrolyte 30# | 18 | 4.5 | | 59 | 1.5 | | | 1 | 11 | 5 |
| Electrolyte 31# | 18 | 4.5 | | 59 | 1.0 | | | 1.5 | 11 | 5 |
| Electrolyte 32# | 18 | 4.0 | | 59 | 1.0 | | | 2 | 11 | 5 |
| Electrolyte 33# | 18 | 4.5 | | 59 | 1.8 | | | 0.7 | 11 | 5 |
| Electrolyte 34# | 18 | 4.5 | | 59 | 1.5 | 0.5 | | 0.5 | 11 | 5 |
| Comparative Electrolyte 7# | 20 | 5 | | 55.2 | 1.8 | | | | 7 | 11 |
| Comparative Electrolyte 8# | 20 | 5 | | 55.4 | 1.8 | | | | 15 | 2.8 |
| Comparative Electrolyte 9# | 19.4 | 4.8 | | 53.5 | 1.8 | | | | 10.5 | 10 |
| Comparative Electrolyte 10# | 21.6 | 5.4 | | 59.7 | 1.8 | | | | 6 | 5.5 |

TABLE 2-2

| Number | Electrolyte | Capacity retention rate at 5 C (%) | Capacity retention rate at 10 C (%) | Low-temperature capacity retention rate at 0.5 C (%) | Low-temperature capacity retention rate at 1 C (%) | Number of cycles at room temperature | Number of cycles at high temperature |
|---|---|---|---|---|---|---|---|
| Example 13 | Electrolyte 13# | 91 | 86 | 83 | 78 | 1334 | 898 |
| Example 14 | Electrolyte 14# | 82 | 80 | 88 | 82 | 1112 | 710 |
| Example 15 | Electrolyte 15# | 70 | 65 | 82 | 80 | 1011 | 769 |
| Example 16 | Electrolyte 16# | 78 | 67 | 72 | 60 | 1032 | 870 |
| Example 17 | Electrolyte 17# | 91 | 87 | 91 | 85 | 1130 | 730 |
| Example 18 | Electrolyte 18# | 91 | 87 | 90 | 85 | 1235 | 876 |
| Example 19 | Electrolyte 19# | 89 | 85 | 89 | 83 | 1280 | 898 |
| Example 20 | Electrolyte 20# | 86 | 81 | 86 | 80 | 1311 | 915 |
| Example 21 | Electrolyte 21# | 76 | 71 | 74 | 68 | 1421 | 1015 |
| Example 22 | Electrolyte 22# | 78 | 73 | 78 | 72 | 1403 | 1003 |
| Example 23 | Electrolyte 23# | 82 | 78 | 82 | 77 | 1387 | 996 |
| Example 24 | Electrolyte 24# | 84 | 80 | 84 | 79 | 1339 | 948 |
| Example 25 | Electrolyte 25# | 94 | 89 | 87 | 81 | 1180 | 768 |
| Example 26 | Electrolyte 26# | 78 | 73 | 82 | 80 | 1238 | 789 |
| Example 27 | Electrolyte 27# | 92 | 87 | 88 | 82 | 1212 | 862 |
| Example 28 | Electrolyte 28# | 75 | 70 | 78 | 76 | 1210 | 767 |
| Example 29 | Electrolyte 29# | 94 | 88 | 89 | 81 | 1112 | 730 |
| Example 30 | Electrolyte 30# | 83 | 73 | 79 | 67 | 1398 | 1025 |
| Example 31 | Electrolyte 31# | 82 | 73 | 80 | 68 | 1355 | 1098 |
| Example 32 | Electrolyte 32# | 84 | 74 | 80 | 69 | 1323 | 1115 |
| Example 33 | Electrolyte 33# | 83 | 72 | 78 | 66 | 1412 | 1000 |
| Example 34 | Electrolyte 34# | 83 | 72 | 76 | 65 | 1421 | 998 |
| Comparative Example 7 | Comparative Electrolyte 7# | 88 | 84 | 85 | 79 | 898 | 675 |
| Comparative Example 8 | Comparative Electrolyte 8# | 75 | 68 | 68 | 57 | 1065 | 710 |
| Comparative Example 9 | Comparative Electrolyte 9# | 82 | 77 | 75 | 63 | 890 | 760 |
| Comparative Example 10 | Comparative Electrolyte 10# | 81 | 70 | 78 | 71 | 888 | 580 |

With reference to the data in Table 2-1 and Table 2-2, Comparative Examples 7 to 10 were provided in comparison with Example 13. A ratio of the percentage of LiFSI to the percentage of LiPF$_6$ in Comparative Electrolyte 7# was greater than 1.5 (that is, a/b>1.5). Although the lithium-ion battery in Comparative Example 7 had better rate performance and low-temperature performance, the lithium-ion battery had a largely decreased cycling performance at room temperature and high temperature. A ratio of the percentage of LiFSI to the percentage of LiPF$_6$ in Comparative Electrolyte 8# was less than 0.2 (that is, a/b<0.2). Although the lithium-ion battery in Comparative Example 8 had better cycling performance, the lithium-ion battery had relatively poor rate performance and low-temperature performance A percentage of total LiFSI and LiPF$_6$ in Comparative Electrolyte 9# was higher than 20%, viscosity of the electrolyte is excessively high due to the high percentage of lithium salts, which may cause the lithium-ion battery to have different degrees of decline all aspects such as rate performance, low-temperature performance, room-temperature cycling performance, and high-temperature cycling performance. A percentage of total LiFSI and LiPF$_6$ in Comparative Electrolyte 10# was lower than 12%, resulting in insufficient amount of lithium ions that can participate in the electrochemical reaction, which also caused the lithium-ion battery to have different degrees of decline in all aspects such as rate performance, low-temperature performance, room-temperature cycling performance, and high-temperature cycling performance Therefore, by comparing Example 13 and Comparative Examples 7 to 10, it can be seen that when the weight percentages of lithium salts LiFSI and LiPF$_6$ in the electrolyte (a % and b %, respectively) satisfied 12<a+b<20 and 0.2<a/b<1.5, it can significantly improve the rate performance and the low-temperature performance of the electrochemical apparatus, and ensured that the electrochemical apparatus had good cycle stability in room-temperature and high-temperature environments, thereby achieving excellent comprehensive performance.

temperature and the high temperature has been greatly improved. Therefore, when the percentage of LiFSI was in the range of 2<a<11, the accordingly obtained electrochemical apparatuses exhibited more excellent comprehensive performance.

The percentages of LiPF$_6$ in Electrolytes 21# and 22# were higher than 14% and the percentages of LiPF$_6$ in Electrolytes 23# to 24# were in the range of 4.8<a<14. It can be seen from the electrochemical data of Examples 21 to 24 that although the cycling performance of the electrochemical apparatuses in Examples 23 to 24 at room temperature and high temperature had a small decrease, their rate performance at the room temperature and the low temperature has been greatly improved. Therefore, when the percentage of LiPF$_6$ was in the range of 4.8<b<14, the accordingly obtained electrochemical apparatuses exhibited more excellent comprehensive performance.

By comparing the comprehensive performance of the lithium-ion batteries in Example 19 and Examples 25 to 29, it can be concluded that the weight percentages d % of DMC in the electrolytes preferably satisfied 45<d<70, and more preferably satisfied 50<d<65.

(3) The electrolytes were prepared according to the formulation shown in Table 3-1 (where the second compound was added in the electrolytes, and the second compound included at least one of ethylene sulfate (DTD), 2,4-butane sultone, 5-methyloxathiolane 2,2-dioxide, or 1,3-propane sultone (PS)), and the prepared lithium-ion batteries were tested according to the foregoing test methods, and the positive electrode active material was LiNi$_{0.85}$Co$_{0.05}$Mn$_{0.1}$O$_2$. For test results, refer to Table 3-2.

TABLE 3-1

| | Weight percentage of component in electrolyte (%) | | | | | | | | |
|---|---|---|---|---|---|---|---|---|---|
| | EC | DMC | DTD | PS | 2,4-butane sultone | 5-methyloxathiolan | VC | FEC | LiPF$_6$ | LiFSI |
| Electrolyte 35# | 13.9 | 68 | | 2 | | | 0.1 | 2 | 8 | 6 |
| Electrolyte 36# | 24.2 | 56 | | 0.5 | 0.8 | | 1 | 0.5 | 7 | 10 |
| Electrolyte 37# | 19.2 | 60 | 0.5 | 1 | | 1 | 1.3 | | 7 | 10 |

TABLE 3-2

| Number | Electrolyte | Capacity retention rate at 5 C (%) | Capacity retention rate at 10 C (%) | Low-temperature capacity retention rate at 0.5 C (%) | Low-temperature capacity retention rate at 1 C (%) | Number of cycles at room temperature | Number of cycles at high temperature |
|---|---|---|---|---|---|---|---|
| Example 35 | Electrolyte 35# | 88 | 75 | 89 | 83 | 1158 | 768 |
| Example 36 | Electrolyte 36# | 90 | 86 | 81 | 76 | 1234 | 1018 |
| Example 37 | Electrolyte 37# | 89 | 85 | 83 | 79 | 1245 | 1046 |

Compared with other examples in Table 2-1, the weight percentage of the first compound (that is, ethyl methyl carbonate (EMC) or diethyl carbonate (DEC)) in Example 15 was higher than 10%, which had a slight impact on the rate performance of the electrochemical apparatus at room temperature and low temperature.

The percentage of LiFSI in Electrolyte 17# was higher than 11% and the percentages of LiFSI in Electrolytes 18# to 20# were in the range of 2<a<11. It can be seen from the electrochemical data of Examples 17 to 20 that although the rate performance of the electrochemical apparatuses in Examples 18 to 20 at room temperature and low temperature had a small decrease, their cycle stability at the room It can be seen from the data in Table 3-1 and Table 3-2 that when the total weight percentages of the second compound in the electrolytes is lower than or equal to 4%, the accordingly obtained electrochemical apparatus can exhibit excellent comprehensive performance Compared with Examples 36 and 37, the high-temperature cycling performance in Example 35 was slightly worse, which was due to the higher percentages of DMC in the electrolytes.

In addition, it can be seen from the data in Table 2-1 and Table 2-2 that, based on the total weight of the electrolyte, when the weight percentage of the 1,3-propane sultone (PS) ranged from 0.1% to 2.0%, the high-temperature performance and low-temperature performance of the electrochemical apparatus can be further equilibrated.

(4) The electrolytes were prepared according to the formulation shown in Table 4-1 (where both the first compound and the second compound were added in the electrolytes, the first compound includes at least one of ethyl methyl carbonate (EMC) or diethyl carbonate (DEC), and the second compound included at least one of ethylene sulfate (DTD), 2,4-butane sultone, 5-methyloxathiolane 2,2-dioxide, or 1,3-propane sultone (PS)), and the prepared lithium-ion batteries were tested according to the foregoing test methods, and the positive electrode active material was LiNi$_{0.85}$Co$_{0.05}$Mn$_{0.1}$O$_2$. For test results, refer to Table 4-2.

TABLE 4-1

| | Weight percentage of component in electrolyte (%) | | | | | | | | | | | |
|---|---|---|---|---|---|---|---|---|---|---|---|---|
| | EC | EMC | DEC | DMC | DTD | PS | 2,4-butane sultone | 5-methyloxathiolane 2,2-dioxide | VC | FEC | LiPF$_6$ | LiFSI |
| Electrolyte 38# | 20 | 5 | | 54.5 | | 0.5 | | | 1 | | 8 | 11 |
| Electrolyte 39# | 18 | 3 | | 64.7 | | 0.1 | | | 0.5 | 1.2 | 5 | 7.5 |
| Electrolyte 40# | 28 | 8 | | 47 | | 1.5 | | | 1.5 | | 8 | 6 |
| Electrolyte 41# | 20 | 5 | | 56.5 | 1 | | | | 1.5 | | 11 | 5 |
| Electrolyte 42# | 20 | 5 | | 54 | | | 1 | | 2 | | 10 | 8 |
| Electrolyte 43# | 20 | 4 | 2 | 54 | | | 1 | | | 2 | 7 | 10 |
| Electrolyte 44# | 20 | 3 | | 61 | | | | 1 | 1.5 | | 6 | 7.5 |
| Electrolyte 45# | 18 | 5 | | 54.5 | | 4 | | | 1.5 | | 7 | 10 |
| Electrolyte 46# | 18.5 | 5.1 | | 55.9 | | 2 | | | 1.5 | | 7 | 10 |
| Electrolyte 47# | 18.7 | 5.2 | | 56.6 | | 1 | | | 1.5 | | 7 | 10 |
| Electrolyte 48# | 18.8 | 5.2 | | 57 | | 0.5 | | | 1.5 | | 7 | 10 |

TABLE 4-2

| Number | Electrolyte | Capacity retention rate at 5 C (%) | Capacity retention rate at 10 C (%) | Low-temperature capacity retention rate at 0.5 C (%) | Low-temperature capacity retention rate at 1 C (%) | Number of cycles at room temperature | Number of cycles at high temperature |
|---|---|---|---|---|---|---|---|
| Example 38 | Electrolyte 38# | 81 | 72 | 90 | 84 | 1153 | 892 |
| Example 39 | Electrolyte 39# | 87 | 73 | 89 | 83 | 1002 | 725 |
| Example 40 | Electrolyte 40# | 83 | 72 | 77 | 65 | 1098 | 896 |
| Example 41 | Electrolyte 41# | 87 | 84 | 83 | 79 | 1291 | 1005 |
| Example 42 | Electrolyte 42# | 90 | 87 | 80 | 75 | 1521 | 1134 |
| Example 43 | Electrolyte 43# | 88 | 85 | 85 | 81 | 1325 | 998 |
| Example 44 | Electrolyte 44# | 87 | 83 | 87 | 82 | 1289 | 880 |
| Example 45 | Electrolyte 45# | 82 | 70 | 77 | 67 | 1238 | 980 |
| Example 46 | Electrolyte 46# | 86 | 78 | 83 | 73 | 1220 | 970 |
| Example 47 | Electrolyte 47# | 88 | 82 | 85 | 77 | 1218 | 945 |
| Example 48 | Electrolyte 48# | 89 | 85 | 86 | 80 | 1205 | 916 |

It can be seen from the data in Table 4-1 and Table 4-2 that when the total weight percentages of the second compound in the electrolytes is lower than or equal to 4%, the accordingly obtained electrochemical apparatuses can exhibit excellent comprehensive performance.

It can be seen from the data in Examples 45 to 48 that the percentage of PS was further optimized to range from 0.1% to 2.0%, the accordingly obtained electrochemical apparatuses exhibited better rate performance at room temperature and low temperature, and can also maintain the cycling performance in a more ideal range at high temperature and room temperature.

(5) The electrolytes were prepared according to the formulation shown in Table 5-1 (where the propynyl compound was added in the electrolytes, and the propynyl compound included at least one of 2-propyn-1-yl 1H-imidazole-1-carboxylate or 2-propynyl methyl carbonate), and the prepared lithium-ion batteries were tested according to the foregoing test methods, and the positive electrode active material was LiNi$_{0.85}$Co$_{0.05}$Mn$_{0.1}$O$_2$. For test results, refer to Table 5-2.

TABLE 5-1

| | | Weight percentage of component in electrolyte (%) | | | | | | | | |
|---|---|---|---|---|---|---|---|---|---|---|
| | | EC | EMC | DMC | VC | PS | 2-propyn-1-yl 1H-imidazole-1-carboxylate | 2-propynyl methyl carbonate | LiPF$_6$ | LiFSI |
| Example 49 | Electrolyte 49# | 20 | 5 | 57 | 1.5 | | 0.5 | | 12 | 4 |
| Example 50 | Electrolyte 50# | 20 | 5 | 59.7 | 1.5 | | | 0.3 | 11 | 2.5 |

TABLE 5-1-continued

| | | Weight percentage of component in electrolyte (%) | | | | | | | | |
|---|---|---|---|---|---|---|---|---|---|---|
| | | EC | EMC | DMC | VC | PS | 2-propyn-1-yl 1H-imidazole-1-carboxylate | 2-propynyl methyl carbonate | $LiPF_6$ | LiFSI |
| Example 51 | Electrolyte 51# | 20 | 5 | 59 | 1.5 | | | 0.1 | 11 | 3.4 |
| Example 52 | Electrolyte 52# | 20 | 5 | 58 | 1.5 | 1 | | 0.1 | 11 | 3.4 |
| Example 53 | Electrolyte 53# | 20 | 5 | 58 | 1.5 | 0.8 | | 0.3 | 11 | 3.4 |
| Example 54 | Electrolyte 54# | 20 | 5 | 58 | 1.5 | 0.5 | | 0.3 | 11 | 3.7 |

TABLE 5-2

| Number | Electrolyte | Capacity retention rate at 5 C (%) | Capacity retention rate at 10 C (%) | Low-temperature capacity retention rate at 0.5 C (%) | Low-temperature capacity retention rate at 1 C (%) | Number of cycles at room temperature | Number of cycles at high temperature |
|---|---|---|---|---|---|---|---|
| Example 49 | Electrolyte 49# | 85 | 78 | 83 | 75 | 1298 | 1038 |
| Example 50 | Electrolyte 50# | 82 | 75 | 80 | 71 | 1210 | 1011 |
| Example 51 | Electrolyte 51# | 84 | 80 | 82 | 74 | 1178 | 965 |
| Example 52 | Electrolyte 52# | 83 | 78 | 81 | 72 | 1324 | 1045 |
| Example 53 | Electrolyte 53# | 81 | 75 | 79 | 70 | 1339 | 1057 |
| Example 54 | Electrolyte 54# | 82 | 77 | 80 | 72 | 1288 | 1040 |

It can be seen from the data in Table 5-1 and Table 5-2 that when the total weight percentages of the propynyl compound in the electrolytes were lower than 1%, the accordingly obtained electrochemical apparatuses can exhibit excellent comprehensive performance Compared with Example 51, in Examples 52 to 54, different percentages of PS were further added to the electrolytes, and the room-temperature cycling performance and high-temperature cycling performance of the accordingly obtained electrochemical apparatuses were improved to some extent.

(6) The electrolytes were prepared according to the formulation shown in Table 6-1 (where the boron-containing lithium salt was added in the electrolytes, and the boron-containing lithium salt included at least one of lithium difluoro(oxalato)borate (LiDFOB), lithium bis(oxalato)borate (LiBOB), lithium tetrafluoroborate ($LiBF_4$), or lithium tetraborate ($Li_2B_4O_7$)), and the prepared lithium-ion batteries were tested according to the foregoing test methods, and the positive electrode active material was $LiNi_{0.85}Co_{0.05}Mn_{0.1}O_2$. For test results, refer to Table 6-2.

TABLE 6-1

| | | Weight percentage of component in electrolyte (%) | | | | | | | | | |
|---|---|---|---|---|---|---|---|---|---|---|---|
| | | EC | EMC | DMC | VC | LiDFOB | LiBOB | $LiBF_4$ | $Li_2B_4O_7$ | $LiPF_6$ | LiFSI |
| Example 55 | Electrolyte 55# | 20 | 5 | 55 | 1.5 | 0.7 | | | | 14 | 4 |
| Example 56 | Electrolyte 56# | 20 | 5 | 54.5 | 1.5 | | 0.6 | | | 13.5 | 5 |
| Example 57 | Electrolyte 57# | 20 | 5 | 57 | 1.5 | | | 0.2 | | 10 | 6 |
| Example 58 | Electrolyte 58# | 20 | 5 | 55 | 1.5 | | | | 0.5 | 8 | 10 |

TABLE 6-2

| Number | Electrolyte | Capacity retention rate at 5 C (%) | Capacity retention rate at 10 C (%) | Low-temperature capacity retention rate at 0.5 C (%) | Low-temperature capacity retention rate at 1 C (%) | Number of cycles at room temperature | Number of cycles at high temperature |
|---|---|---|---|---|---|---|---|
| Example 55 | Electrolyte 55# | 88 | 83 | 84 | 75 | 1538 | 1129 |
| Example 56 | Electrolyte 56# | 87 | 82 | 84 | 77 | 1325 | 1089 |
| Example 57 | Electrolyte 57# | 90 | 86 | 88 | 82 | 1290 | 898 |
| Example 58 | Electrolyte 58# | 92 | 88 | 90 | 85 | 1340 | 980 |

It can be seen from the data in Table 6-1 and Table 6-2 that when the total weight percentages of the boron-containing lithium salt in the electrolytes were lower than 1%, the accordingly obtained electrochemical apparatuses can exhibit excellent comprehensive performance.

(7) The electrolytes were prepared according to the formulation shown in Table 7-1 (where the difluorophosphate salt was added in the electrolytes, and the difluorophosphate salt included at least one of lithium difluorophosphate ($LiPO_2F_2$) or lithium difluorooxalate phosphate (LiDFOP)), and the prepared lithium-ion batteries were tested according to the foregoing test methods, and the positive electrode active material was $LiNi_{0.85}Co_{0.05}Mn_{0.1}O_2$. For test results, refer to Table 7-2.

TABLE 7-1

| | | Weight percentage of component in electrolyte (%) | | | | | | | |
|---|---|---|---|---|---|---|---|---|---|
| | | EC | EMC | DMC | VC | $LiPO_2F_2$ | LiDFOP | $LiPF_6$ | LiFSI |
| Example 59 | Electrolyte 59# | 20 | 5 | 58 | 1.5 | 0.8 | | 6.5 | 8 |
| Example 60 | Electrolyte 60# | 20 | 5 | 57 | | | 1 | 12 | 5 |
| Example 61 | Electrolyte 61# | 20 | 5 | 58 | 1 | 0.3 | | 12 | 3.7 |

TABLE 7-2

| Number | Electrolyte | Capacity retention rate at 5 C (%) | Capacity retention rate at 10 C (%) | Low-temperature capacity retention rate at 0.5 C (%) | Low-temperature capacity retention rate at 1 C (%) | Number of cycles at room temperature | Number of cycles at high temperature |
|---|---|---|---|---|---|---|---|
| Example 59 | Electrolyte 59# | 92 | 88 | 88 | 82 | 1298 | 976 |
| Example 60 | Electrolyte 60# | 88 | 84 | 85 | 80 | 1310 | 1002 |
| Example 61 | Electrolyte 61# | 85 | 80 | 82 | 76 | 1329 | 1034 |

It can be seen from the data in Table 7-1 and Table 7-2 that when the total weight percentages of the difluorophosphate salt in the electrolytes were lower than 1.5%, the accordingly obtained electrochemical apparatuses can exhibit excellent comprehensive performance.

(8) According to Table 8-1, Electrolyte 1#, Electrolyte 2#, and Electrolyte 3# were combined with positive electrode active materials of different contents of nickel to prepare lithium-ion batteries, and the prepared lithium-ion batteries were tested according to the foregoing test methods. The positive electrode active materials were shown in Table 8-1, and the test results were also shown in Table 8-1.

TABLE 8-1

| Number | Positive electrode active material | Electrolyte | Capacity retention rate at 5 C (%) | Capacity retention rate at 10 C (%) | Low-temperature capacity retention rate at 0.5 C (%) | Low-temperature capacity retention rate at 1 C (%) | Number of cycles at room temperature | Number of cycles at high temperature |
|---|---|---|---|---|---|---|---|---|
| Example 1 | $LiNi_{0.85}Co_{0.05}Mn_{0.1}O_2$ | Electrolyte 1# | 11.8 | 85 | 78 | 80 | 75 | 1280 | 758 |
| Example 2 | $LiNi_{0.85}Co_{0.05}Mn_{0.1}O_2$ | Electrolyte 2# | 17.6 | 87 | 83 | 81 | 75 | 1421 | 1012 |
| Example 3 | $LiNi_{0.85}Co_{0.05}Mn_{0.1}O_2$ | Electrolyte 3# | 7.1 | 92 | 88 | 89 | 83 | 1125 | 738 |
| Example 62 | $LiNi_{0.7}Co_{0.15}Mn_{0.15}O_2$ | Electrolyte 1# | 14.3 | 88 | 82 | 82 | 78 | 1610 | 1188 |
| Example 63 | $LiNi_{0.7}Co_{0.15}Mn_{0.15}O_2$ | Electrolyte 2# | 21.4 | 89 | 85 | 84 | 80 | 1698 | 1222 |
| Example 64 | $LiNi_{0.7}Co_{0.15}Mn_{0.15}O_2$ | Electrolyte 3# | 8.6 | 93 | 89 | 90 | 84 | 1415 | 991 |
| Example 65 | $LiNi_{0.5}Co_{0.2}Mn_{0.3}O_2$ | Electrolyte 1# | 20 | 91 | 85 | 85 | 82 | 2490 | 1613 |
| Example 66 | $LiNi_{0.5}Co_{0.2}Mn_{0.3}O_2$ | Electrolyte 2# | 30 | 87 | 83 | 82 | 78 | 2481 | 1610 |
| Example 67 | $LiNi_{0.5}Co_{0.2}Mn_{0.3}O_2$ | Electrolyte 3# | 12 | 92 | 88 | 89 | 83 | 2425 | 1638 |
| Example 68 | $LiNi_{0.85}Co_{0.05}Mn_{0.1}O_2:LiMn_2O_4 = 8:2$ | Electrolyte 1# | 11.8 | 88 | 80 | 82 | 78 | 1180 | 718 |
| Example 69 | $LiNi_{0.85}Co_{0.05}Mn_{0.1}O_2:LiMn_2O_4 = 8:2$ | Electrolyte 2# | 17.6 | 89 | 85 | 85 | 80 | 1371 | 812 |
| Example 70 | $LiNi_{0.85}Co_{0.05}Mn_{0.1}O_2:LiMn_2O_4 = 8:2$ | Electrolyte 3# | 7.1 | 93 | 89 | 90 | 84 | 1015 | 715 |
| Example 71 | $LiNi_{0.85}Co_{0.1}Al_{0.05}O_2$ | Electrolyte 3# | 7.1 | 91 | 87 | 89 | 84 | 1117 | 748 |

It can be seen from the data in Table 8-1 that when the weight percentages b % of $LiPF_6$ in the electrolytes and content of Ni in the positive electrode active material, x, satisfied 4<b/y<40, the accordingly obtained electrochemical apparatuses can exhibit excellent comprehensive performance.

In addition, as the content of nickel in the positive electrode active material increased, the cycle stability of the electrochemical apparatus decreased. In addition, the cycle stability of electrochemical apparatuses increased with the continuous increase of the content of the lithium salt $LiPF_6$ in the electrolytes. This trend was more obvious for positive electrode active materials with higher content of nickel (for example, $LiNi_{0.85}Co_{0.05}Mn_{0.1}O_2$ and $LiNi_{0.7}Co_{0.15}Mn_{0.15}O_2$).

(9) Lithium iron phosphate was used as the primary component of the positive electrode active material. The compacted density of the positive electrode plate, the electrolytes used, and the electrochemical performance of the electrochemical apparatus were shown in Table 9-1.

TABLE 9-1

| Number | Positive electrode active material | Positive electrode compacted density j (g/cm³) | Electrolyte | Capacity retention rate at 5 C (%) | Capacity retention rate at 10 C (%) | Low-temperature capacity retention rate at 0.5 C (%) | Low-temperature capacity retention rate at 1 C (%) | Number of cycles at room temperature | Number of cycles at high temperature |
|---|---|---|---|---|---|---|---|---|---|
| Example 72 | LiFePO₄ | 2.0 | Electrolyte 1# | 91 | 82 | 72 | 68 | 4920 | 2653 |
| Example 73 | LiFePO₄ | 2.0 | Electrolyte 2# | 93 | 89 | 74 | 70 | 5184 | 2742 |
| Example 74 | LiFePO₄ | 2.0 | Electrolyte 3# | 98 | 93 | 80 | 75 | 5230 | 2983 |
| Example 75 | LiFePO₄ | 2.0 | Electrolyte 4# | 98 | 93 | 75 | 71 | 5556 | 3365 |
| Example 76 | LiFePO₄ | 2.0 | Electrolyte 5# | 88 | 78 | 70 | 63 | 5580 | 3393 |
| Example 77 | LiFePO₄ | 2.0 | Electrolyte 6# | 86 | 76 | 77 | 69 | 4712 | 3185 |
| Example 78 | LiFePO₄ | 2.0 | Electrolyte 7# | 91 | 80 | 72 | 65 | 5200 | 3316 |
| Example 79 | LiFePO₄ | 2.0 | Electrolyte 8# | 95 | 89 | 76 | 68 | 5004 | 3185 |
| Example 80 | LiFePO₄ | 2.0 | Electrolyte 9# | 98 | 94 | 78 | 72 | 4840 | 3003 |
| Example 81 | LiFePO₄ | 2.0 | Electrolyte 10# | 99 | 95 | 80 | 75 | 4832 | 2944 |
| Example 82 | LiFePO₄ | 2.0 | Electrolyte 11# | 99 | 95 | 81 | 76 | 4756 | 2923 |
| Example 83 | LiFePO₄ | 2.0 | Electrolyte 12# | 98 | 93 | 78 | 74 | 4228 | 2804 |
| Comparative Example 11 | LiFePO₄ | 2.0 | Comparative Electrolyte 1# | 81 | 64 | 54 | 43 | 3520 | 2142 |
| Comparative Example 12 | LiFePO₄ | 2.0 | Comparative Electrolyte 2# | 96 | 94 | 84 | 81 | 2648 | 1103 |
| Comparative Example 13 | LiFePO₄ | 2.0 | Comparative Electrolyte 3# | 75 | 73 | 50 | 33 | 3480 | 2310 |
| Comparative Example 14 | LiFePO₄ | 2.0 | Comparative Electrolyte 4# | 95 | 92 | 77 | 70 | 2196 | 1057 |
| Comparative Example 15 | LiFePO₄ | 2.0 | Comparative Electrolyte 5# | 82 | 67 | 59 | 48 | 2345 | 1568 |
| Comparative Example 16 | LiFePO₄ | 2.0 | Comparative Electrolyte 6# | 84 | 68 | 55 | 43 | 2429 | 1614 |
| Example 84 | LiFePO₄ | 2.0 | Electrolyte 13# | 97 | 92 | 75 | 70 | 5336 | 3143 |
| Example 85 | LiFePO₄ | 2.0 | Electrolyte 14# | 88 | 86 | 79 | 74 | 4848 | 2555 |
| Example 86 | LiFePO₄ | 2.0 | Electrolyte 15# | 80 | 73 | 74 | 72 | 4544 | 2692 |
| Example 87 | LiFePO₄ | 2.0 | Electrolyte 16# | 84 | 72 | 65 | 54 | 4128 | 3045 |
| Example 88 | LiFePO₄ | 2.0 | Electrolyte 17# | 97 | 93 | 82 | 77 | 4520 | 2555 |
| Example 89 | LiFePO₄ | 2.0 | Electrolyte 18# | 97 | 93 | 82 | 77 | 4940 | 3066 |
| Example 90 | LiFePO₄ | 2.0 | Electrolyte 19# | 95 | 91 | 81 | 75 | 5120 | 3143 |
| Example 91 | LiFePO₄ | 2.0 | Electrolyte 20# | 92 | 87 | 78 | 72 | 5244 | 3203 |
| Example 92 | LiFePO₄ | 2.0 | Electrolyte 21# | 85 | 80 | 67 | 62 | 5764 | 3618 |
| Example 93 | LiFePO₄ | 2.0 | Electrolyte 22# | 87 | 82 | 71 | 67 | 5692 | 3581 |
| Example 94 | LiFePO₄ | 2.0 | Electrolyte 23# | 92 | 86 | 74 | 71 | 5548 | 3486 |
| Example 95 | LiFePO₄ | 2.0 | Electrolyte 24# | 94 | 90 | 76 | 73 | 5356 | 3318 |
| Example 96 | LiFePO₄ | 2.0 | Electrolyte 25# | 99 | 95 | 79 | 73 | 4720 | 2688 |
| Example 97 | LiFePO₄ | 2.0 | Electrolyte 26# | 85 | 79 | 74 | 72 | 4952 | 2762 |
| Example 98 | LiFePO₄ | 2.0 | Electrolyte 27# | 98 | 93 | 80 | 74 | 4848 | 3017 |
| Example 99 | LiFePO₄ | 2.0 | Electrolyte 28# | 82 | 77 | 71 | 68 | 4840 | 2685 |
| Example 100 | LiFePO₄ | 2.0 | Electrolyte 29# | 99 | 94 | 81 | 73 | 4448 | 2555 |
| Example 101 | LiFePO₄ | 2.0 | Electrolyte 30# | 91 | 79 | 71 | 61 | 4874 | 3188 |
| Example 102 | LiFePO₄ | 2.0 | Electrolyte 31# | 90 | 79 | 72 | 62 | 4708 | 3443 |
| Example 103 | LiFePO₄ | 2.0 | Electrolyte 32# | 92 | 80 | 72 | 63 | 4585 | 3503 |
| Example 104 | LiFePO₄ | 2.0 | Electrolyte 33# | 91 | 78 | 70 | 60 | 4927 | 3500 |
| Example 105 | LiFePO₄ | 2.0 | Electrolyte 34# | 91 | 78 | 68 | 59 | 4962 | 3493 |
| Comparative Example 17 | LiFePO₄ | 2.0 | Comparative Electrolyte 7# | 97 | 92 | 79 | 73 | 3592 | 2363 |
| Comparative Example 18 | LiFePO₄ | 2.0 | Comparative Electrolyte 8# | 83 | 75 | 65 | 54 | 4400 | 2485 |
| Comparative Example 19 | LiFePO₄ | 2.0 | Comparative Electrolyte 9# | 88 | 82 | 68 | 57 | 3560 | 2660 |
| Comparative Example 20 | LiFePO₄ | 2.0 | Comparative Electrolyte 10# | 86 | 75 | 70 | 64 | 3552 | 2030 |
| Example 106 | LiFePO₄ | 2.0 | Electrolyte 35# | 94 | 80 | 80 | 75 | 4632 | 2653 |
| Example 107 | LiFePO₄ | 2.0 | Electrolyte 36# | 96 | 92 | 73 | 68 | 4936 | 3563 |
| Example 108 | LiFePO₄ | 2.0 | Electrolyte 37# | 95 | 91 | 75 | 71 | 4980 | 3661 |
| Example 109 | LiFePO₄ | 2.0 | Electrolyte 38# | 86 | 77 | 81 | 76 | 4612 | 2622 |
| Example 110 | LiFePO₄ | 2.0 | Electrolyte 39# | 93 | 78 | 80 | 75 | 4008 | 2538 |
| Example 111 | LiFePO₄ | 2.0 | Electrolyte 40# | 89 | 77 | 70 | 63 | 4392 | 3136 |

TABLE 9-1-continued

| Number | Positive electrode active material | Positive electrode compacted density j (g/cm$^3$) | Electrolyte | Capacity retention rate at 5 C (%) | Capacity retention rate at 10 C (%) | Low-temperature capacity retention rate at 0.5 C (%) | Low-temperature capacity retention rate at 1 C (%) | Number of cycles at room temperature | Number of cycles at high temperature |
|---|---|---|---|---|---|---|---|---|---|
| Example 112 | LiFePO$_4$ | 2.0 | Electrolyte 41# | 93 | 90 | 75 | 71 | 5164 | 3518 |
| Example 113 | LiFePO$_4$ | 2.0 | Electrolyte 42# | 96 | 93 | 72 | 68 | 5084 | 3569 |
| Example 114 | LiFePO$_4$ | 2.0 | Electrolyte 43# | 94 | 91 | 77 | 73 | 5300 | 3193 |
| Example 115 | LiFePO$_4$ | 2.0 | Electrolyte 44# | 93 | 89 | 78 | 74 | 5156 | 3080 |
| Example 116 | LiFePO$_4$ | 2.0 | Electrolyte 45# | 88 | 75 | 69 | 60 | 4552 | 2230 |
| Example 117 | LiFePO$_4$ | 2.0 | Electrolyte 46# | 92 | 84 | 75 | 66 | 4880 | 3395 |
| Example 118 | LiFePO$_4$ | 2.0 | Electrolyte 47# | 94 | 88 | 77 | 69 | 4872 | 3308 |
| Example 119 | LiFePO$_4$ | 2.0 | Electrolyte 48# | 95 | 91 | 78 | 72 | 4820 | 3206 |
| Example 120 | LiFePO$_4$ | 2.0 | Electrolyte 49# | 91 | 83 | 75 | 68 | 5192 | 3233 |
| Example 121 | LiFePO$_4$ | 2.0 | Electrolyte 50# | 88 | 80 | 72 | 64 | 4840 | 3239 |
| Example 122 | LiFePO$_4$ | 2.0 | Electrolyte 51# | 90 | 84 | 74 | 67 | 4528 | 3178 |
| Example 123 | LiFePO$_4$ | 2.0 | Electrolyte 52# | 89 | 82 | 73 | 65 | 4789 | 3158 |
| Example 124 | LiFePO$_4$ | 2.0 | Electrolyte 53# | 87 | 79 | 71 | 63 | 5047 | 3400 |
| Example 125 | LiFePO$_4$ | 2.0 | Electrolyte 54# | 88 | 81 | 72 | 65 | 4951 | 3340 |
| Example 126 | LiFePO$_4$ | 2.0 | Electrolyte 55# | 94 | 89 | 77 | 70 | 6152 | 3952 |
| Example 127 | LiFePO$_4$ | 2.0 | Electrolyte 56# | 93 | 88 | 76 | 69 | 5300 | 3612 |
| Example 128 | LiFePO$_4$ | 2.0 | Electrolyte 57# | 96 | 92 | 79 | 74 | 5160 | 3143 |
| Example 129 | LiFePO$_4$ | 2.0 | Electrolyte 58# | 98 | 94 | 81 | 77 | 5360 | 3430 |
| Example 130 | LiFePO$_4$ | 2.0 | Electrolyte 59# | 98 | 94 | 79 | 74 | 5192 | 3416 |
| Example 131 | LiFePO$_4$ | 2.0 | Electrolyte 60# | 94 | 90 | 77 | 72 | 5240 | 3507 |
| Example 132 | LiFePO$_4$ | 2.0 | Electrolyte 61# | 91 | 84 | 74 | 69 | 4908 | 3419 |
| Example 133 | LiFePO$_4$:LiMn$_2$O$_4$ = 9:1 | 2.0 | Electrolyte 1# | 92 | 82 | 74 | 71 | 4721 | 2323 |
| Example 134 | LiFePO$_4$:LiMn$_2$O$_4$ = 9:1 | 2.0 | Electrolyte 2# | 93 | 88 | 76 | 73 | 4974 | 2541 |
| Example 135 | LiFePO$_4$:LiMn$_2$O$_4$ = 9:1 | 2.0 | Electrolyte 3# | 98 | 92 | 82 | 76 | 5013 | 2782 |
| Example 136 | LiFePO$_4$ | 1.7 | Electrolyte 1# | 95 | 91 | 80 | 76 | 5230 | 3098 |
| Example 137 | LiFePO$_4$ | 1.7 | Electrolyte 2# | 97 | 94 | 82 | 78 | 5294 | 3145 |
| Example 138 | LiFePO$_4$ | 1.7 | Electrolyte 3# | 98 | 95 | 84 | 80 | 5310 | 3181 |
| Example 139 | LiFePO$_4$ | 2.3 | Electrolyte 1# | 80 | 69 | 50 | 43 | 4321 | 2251 |
| Example 140 | LiFePO$_4$ | 2.3 | Electrolyte 2# | 88 | 81 | 63 | 57 | 4682 | 2548 |
| Example 141 | LiFePO$_4$ | 2.3 | Electrolyte 3# | 94 | 90 | 74 | 67 | 4831 | 2881 |

It can be seen from the data in Examples 72 to 132 and Comparative Examples 11 to 20 in Table 9-1 that the performances of the electrochemical apparatuses prepared with lithium iron phosphate as the primary component of the positive electrode active materials showed a similar rule as that of the electrochemical apparatuses prepared with the nickel material as the primary component of the positive electrode active materials. This fully demonstrates that the electrolyte in the embodiments of this application can significantly improve the rate performance and low-temperature performance of the electrochemical apparatus, while also ensuring cycle stability of the electrochemical apparatus at room temperature and high temperature.

It can be further seen from the data in Examples 133 to 141 in Table 9-1 that when the compacted density of the positive electrode active material layer was reduced to 1.7 g/cm$^3$, with the increase of the percentages of LiFSI, the performances of the batteries were improved, but the magnitude of improvement was small; when the compacted density of the positive electrode active material layer was increased to 2.3 g/cm$^3$, with the increase of the percentages of LiFSI, the performances of the battery were greatly improved. In other words, when the compacted density is higher, the electrolyte needs a higher percentage of LiFSI for the lithium iron phosphate battery to achieve the same performance. When the percentage a % of LiFSI and the compacted density of the positive electrode active material layer, j g/cm$^3$, satisfied 0.35<a/j<7.5, the lithium iron phosphate battery had better comprehensive performance.

References to "some embodiments", "some of the embodiments", "an embodiment", "another example", "examples", "specific examples", or "some examples" in the specification mean the inclusion of specific features, structures, materials, or characteristics described in at least one embodiment or example of this application in the embodiment or example. Therefore, descriptions in various places throughout the specification, such as "in some embodiments", "in the embodiments", "in an embodiment", "in another example", "in an example", "in a specific example", or "examples", do not necessarily refer to the same embodiment or example in this application. In addition, a specific feature, structure, material, or characteristic herein may be combined in any appropriate manner in one or more embodiments or examples.

Although illustrative embodiments have been demonstrated and described, a person skilled in the art should understand that the foregoing embodiments are not to be construed as limiting this application, and that the embodiments may be changed, replaced, and modified without departing from the spirit, principle, and scope of this application.

What is claimed is:

1. An electrolyte, comprising lithium bis(fluorosulfonyl) imide and lithium hexafluorophosphate; wherein
based on a total weight of the electrolyte, a weight percentage of the lithium bis(fluorosulfonyl)imide is a %, and a weight percentage of the lithium hexafluorophosphate is b %,
wherein 12<a+b<20 and 0.7≤a/b<1.5; wherein 2<a<5;
wherein the electrolyte comprises a first compound, the first compound comprises diethyl carbonate, and based on the total weight of the electrolyte, a weight percentage of the first compound is c %, wherein c<10; and
wherein the electrolyte further comprises dimethyl carbonate, wherein based on the total weight of the electrolyte, a weight percentage of the dimethyl carbonate is d %, wherein 45<d<65.

2. The electrolyte according to claim 1, wherein $4.8<b<14$.

3. The electrolyte according to claim 1, further comprising a second compound, wherein the second compound comprises at least one of ethylene sulfate, 2,4-butane sultone, 5-methyloxathiolane 2,2-dioxide, or 1,3-propane sultone; and based on the total weight of the electrolyte, a weight percentage of the second compound is e %, wherein $e \leq 3$.

4. The electrolyte according to claim 1, further comprising a third compound, wherein the third compound comprises at least one of vinylene carbonate, vinyl ethylene carbonate, and fluoroethylene carbonate; and based on the total weight of the electrolyte, a weight percentage of the third compound is f %, wherein $f<4$.

5. The electrolyte according to claim 1, further comprising a propynyl compound, wherein the propynyl compound comprises at least one of 2-propyn-1-yl 1H-imidazole-1-carboxylate or 2-propynyl methyl carbonate; and based on the total weight of the electrolyte, a weight percentage of the propynyl compound is g %, wherein $g<1$.

6. The electrolyte according to claim 1, further comprising a boron-containing lithium salt, wherein the boron-containing lithium salt comprises at least one of lithium difluoro(oxalato)borate, lithium bis(oxalato)borate, lithium tetrafluoroborate, or lithium tetraborate; and based on the total weight of the electrolyte, a weight percentage of the boron-containing lithium salt is h %, wherein $h<1$.

7. The electrolyte according to claim 1, further comprising a difluorophosphate salt, wherein the difluorophosphate salt comprises at least one of lithium difluorophosphate or lithium difluorooxalate phosphate; and based on the total weight of the electrolyte, a weight percentage of the difluorophosphate salt is i %, wherein $i<1.5$.

8. The electrolyte according to claim 1, wherein $10<b<14$.

9. The electrolyte according to claim 1, wherein $5.2 \leq c<10$.

10. An electrochemical apparatus, comprising an electrolyte, wherein the electrolyte comprises lithium bis(fluorosulfonyl)imide and lithium hexafluorophosphate;
wherein based on a total weight of the electrolyte, a weight percentage of the lithium bis(fluorosulfonyl) imide is a %, and a weight percentage of the lithium hexafluorophosphate is b %, $12<a+b<20$ and $0.7 \leq a/b<1.5$; wherein $2<a<5$;
wherein the electrolyte comprises a first compound, the first compound comprises diethyl carbonate, and based on the total weight of the electrolyte, a weight percentage of the first compound is c %, wherein $c<10$; and
wherein the electrolyte further comprises dimethyl carbonate, wherein based on the total weight of the electrolyte, a weight percentage of the dimethyl carbonate is d %, wherein $45<d<65$.

11. The electrochemical apparatus according to claim 10, wherein $4.8<b<14$.

12. The electrochemical apparatus according to claim 10, wherein the electrolyte further comprising a second compound, wherein the second compound comprises at least one of ethylene sulfate, 2,4-butane sultone, 5-methyloxathiolane 2,2-dioxide, or 1,3-propane sultone; and
based on the total weight of the electrolyte, a weight percentage of the second compound is e %, wherein $e \leq 3$.

13. The electrochemical apparatus according to claim 10, wherein the electrolyte comprising a third compound, wherein the third compound comprises at least one of vinylene carbonate, vinyl ethylene carbonate, and fluoroethylene carbonate; and based on the total weight of the electrolyte, a weight percentage of the third compound is f %, wherein $f<4$.

14. The electrochemical apparatus according to claim 10, wherein the electrolyte further comprising a propynyl compound, wherein the propynyl compound comprises at least one of 2-propyn-1-yl 1H-imidazole-1-carboxylate or 2-propynyl methyl carbonate; and based on the total weight of the electrolyte, a weight percentage of the propynyl compound is g %, wherein $g<1$.

15. The electrochemical apparatus according to claim 10, further comprising a positive electrode, wherein the positive electrode comprises a positive electrode current collector and a positive electrode active material layer provided on at least one surface of the positive electrode current collector, the positive electrode active material layer comprises a positive electrode active material, and the positive electrode active material satisfies at least one of the following condition (3) or condition (4):
(3) the positive electrode active material comprises a nickel-containing material, and the nickel-containing material comprises $Li_xNi_yMe_zO_2$, wherein Me comprises at least one element of Co, Mn, Al, W, Mg, Ti, Zr, Y, Sr, Cu, F, Si, Na, Fe, Ca, S, or B, $0.5 \leq x<1.2$, $0.5 \leq y \leq 0.96$, $0<z \leq 0.5$, and based on a total weight of the positive electrode active material, a weight percentage of the nickel-containing material is higher than or equal to 70%; or
(4) the positive electrode active material comprises lithium iron phosphate, wherein based on a total weight of the positive electrode active material, a weight percentage of the lithium iron phosphate is higher than or equal to 70%, and compacted density of the positive electrode active material layer is j g/cm$^3$, wherein $0.35<a/j<7.5$.

16. The electrochemical apparatus according to claim 15, wherein the positive electrode active material comprises the nickel-containing material, and the nickel-containing material comprises $Li_xNi_yMe_zO_2$, wherein Me comprises at least one element of Co, Mn, Al, W, Mg, Ti, Zr, Y, Sr, Cu, F, Si, Na, Fe, Ca, S, or B, $0.5 \leq x<1.2$, $0.5 \leq y \leq 0.96$, $0<z \leq 0.5$, and based on the total weight of the positive electrode active material, the weight percentage of the nickel-containing material is higher than or equal to 70%; and $4<b/y<40$.

* * * * *